US008208756B2

(12) United States Patent
Pham

(10) Patent No.: US 8,208,756 B2
(45) Date of Patent: Jun. 26, 2012

(54) ALPHA-MASKED RST IMAGE REGISTRATION

(75) Inventor: Tuan Quang Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 12/336,505

(22) Filed: Dec. 16, 2008

(65) Prior Publication Data

US 2009/0154832 A1 Jun. 18, 2009

(30) Foreign Application Priority Data

Dec. 18, 2007 (AU) .................. 2007249105

(51) Int. Cl.
*G06K 9/36* (2006.01)
*G06K 9/32* (2006.01)

(52) U.S. Cl. ....................... 382/280; 382/294

(58) Field of Classification Search .............. 382/100, 382/278, 280, 289, 294, 298, 300
See application file for complete search history.

(56) References Cited

U.S. PATENT DOCUMENTS

| | | | | |
|---|---|---|---|---|
| 7,567,721 | B2 * | 7/2009 | Alattar et al. | 382/248 |
| 7,778,467 | B2 * | 8/2010 | Iizuka | 382/209 |
| 2006/0210108 | A1 * | 9/2006 | Brunk et al. | 382/100 |
| 2011/0299725 | A1 * | 12/2011 | Rodriguez et al. | 382/100 |

OTHER PUBLICATIONS

Notice of Acceptance in corresponding Australian Application No. 2007249105.
U.S. Appl. No. 12/332,251, International filing date Dec. 10, 2008, Pham, et al.

* cited by examiner

*Primary Examiner* — Yon Couso
(74) *Attorney, Agent, or Firm* — Fitzpatrick, Cella, Harper & Scinto

(57) ABSTRACT

A method (500) of determining rotation and scale transformation parameters is disclosed. The method (500) determines a plurality of weight values associated with one or more parts of at least one of a first and second image (e.g., 154. 155). A representation of each of the first and second images (154. 155) is formed using the weight values, the representation being substantially invariant to translation of the first and second images (154. 155). Rotation and scale transformation parameters relating the first and second images (154. 155) are determined based on the representation of each of the first and second images (154. 155). The rotation and scale transformation parameters are stored.

15 Claims, 19 Drawing Sheets

ALPHA-MASKED RST IMAGE REGISTRATION

CROSS-REFERENCE TO RELATED PATENT APPLICATIONS

This application claims the right of priority under 35 U.S.C. §119 based on Australian Patent Application No. 2007249105, filed 18 Dec. 2007, which is incorporated by reference herein in its entirety as if fully set forth herein.

FIELD OF INVENTION

The present invention relates to the field of image registration, and in particular to a method and apparatus for determining a set of Rotation, Scale and Translation (RST) transformation parameters that registers two input images.

DESCRIPTION OF BACKGROUND ART

Image registration is the process of determining a relationship between pixel elements in a pair of images that have common subject matter. Image registration is an important method in fields such as image matching, satellite imagery and medical imagery. In image matching, two images are compared for common subject matter based on an assumption that some geometrical transformation relates substantial portions of the two images. Determining some parameterised form of the relating transformation is the image registration process.

Image registration may be applied in a number of contexts. For example, image registration is applied in camera calibration, where an image of a known object is captured and the location of that known object within the image is calculated to determine some unknown parameters of the imaging device. Image registration may also be applied in video sequence registration, where the image registration may form part of a system for determining the relative video camera orientation and position between video frames. Image registration may also be applied in document authentication, where the visual characteristics of a document are matched against digital signatures in a database to verify the authenticity of the document.

A simple form of image registration may be used when the two images are related through translation only. In such a case, an error minimization method may be used to determine the translation relating the two images. For example, two images, $f_1(x, y)$, and $f_2(x, y)$ may be functions of pixel coordinates x and y. The unknown shift between the images may be determined by searching for a global minimum of an error function according to Equation (1) below:

$$E(x_0, y_0) = \sum_{x,y} (f_1(x, y) - f_2(x+x_0, y+y_0))^2 \quad (1)$$

where $$\sum_{x,y} ()$$

denotes a summation over the pixel coordinates of the whole image. Expanding the square of Equation (1) leads to Equation (2) below:

$$E(x_0, y_0) = \sum_{x,y} f_1(x, y)^2 + \quad (2)$$

$$\sum_{x,y} f_2(x+x_0, y+y_0)^2 - 2\sum_{x,y} f_1(x, y)f_2(x+x_0, y+y_0)$$

where the first term of Equation (2) is constant. The second term of Equation (2) is also constant under the assumption of periodic boundary conditions which will apply when the Fast Fourier Transform (FFT) is used to do the matching. The third term constitutes a cross-correlation $C(x_0, y_0)$ according to Equation (3) below:

$$C(x_0, y_0) = \sum_{x,y} f_1(x, y)f_2(x+x_0, y+y_0) \quad (3)$$

When the cross correlation $C(x_0, y_0)$ is a maximum, then the error between the two images, $f_1(x, y)$ and $f_2(x, y)$, will be a minimum. Hence, finding a peak in the correlation between two images is the same as minimising the error function between the two images.

Cross-correlation is generally performed using the FFT. For an image f(x, y), the discrete Fourier transform $\Im(f)$ is defined according to Equation (4) below:

$$F(u, v) = \sum_{x=0}^{N_x} \sum_{y=0}^{N_y} f(x, y)e^{-2\pi i x u/N_x} e^{-2\pi i y v/N_y} \quad (4)$$

where $N_x$ and $N_y$ are the image dimensions in the x and y dimensions respectively. The inverse discrete Fourier transform $\Im^{-1}(F)$ is defined according to Equation (5) below:

$$\Im^{-1}(F) = \frac{1}{N_x N_y} \sum_{u=0}^{N_x} \sum_{v=0}^{N_y} F(u, v)e^{2\pi i x u/N_x} e^{2\pi i y v/N_y} \quad (5)$$

The FFT is a computationally efficient method of calculating the Discrete Fourier Transform $\Im(f)$ and the inverse Discrete Fourier Transform $\Im^{-1}(F)$.

A cross-correlation C may be determined according to Equation (6) below:

$$C = \Im^{-1}(\Im(f_1)\Im(f_2)^*) \quad (6)$$

where $\Im(f_2)^*$ denotes the complex conjugation of the Discrete Fourier Transform $\Im(f_2)$.

Thus, taking the inverse FFT $\Im^{-1}(\ )$ of the product of the FFT of one image $\Im(f_1)$ and the complex conjugate of the FFT of the other image $\Im(f_2)^*$ leads to a further image which contains the values of the cross-correlation C which is equivalent to that defined in Equation (3).

While cross-correlation is an effective method of detecting the translation between two images, cross-correlation cannot handle a large area of modifications from one image to another. In the case of two images of a scene with multiple moving objects, for example, cross-correlation may fail to give a correct translation of stationary parts of the scene if the moving objects cover a significant percentage of the total image area. In another example, within the field of document authentication, an image of a physical medium may undergo substantial modifications, such as printing, after an initial digital signature was captured. In this instance, the modified area is likely to have a strong influence on the matching of the digital signatures and naturally, the larger the modified area, the stronger the influence of the modified area.

To deal with modified pixels when correlating two images, a non-negative-valued weight $0 \leq \alpha_i(x, y) \leq 1$ is associated with each pixel $f_i(x, y)$ in both images (i=1, 2). This weight represents a degree of influence of each pixel to the alpha-weighted error function defined according to Equation (7) below:

$$e(x_0, y_0) = \sum_{x,y} (f_1(x, y) - f_2(x + x_0, y + y_0))^2 \alpha_1(x, y) \alpha_2(x + x_0, y + y_0) \quad (7)$$

Similar to the cross-correlation case, the alpha-masked correlation value $e(x_0, y_0)$ may be expressed as a sum of three correlations by expanding the square term in Equation (7) and distributing the square term according to Equation (8) below:

$$e(x_0, y_0) = \sum_{x,y} \alpha_1(x, y) f_1^2(x, y) \alpha_2(x + x_0, y + y_0) - \\ 2 \sum_{x,y} f_1(x, y) f_2(x + x_0, y + y_0) \alpha_1(x, y) \alpha_2(x + x_0, y + y_0) + \\ \sum_{x,y} \alpha_1(x, y) f_2^2(x + x_0, y + y_0) \alpha_2(x + x_0, y + y_0) \quad (8)$$

Let the symbol $\otimes$ denote the correlation of two functions g and h according to Equation (9) below:

$$(g \otimes h)(m) = \sum_x g(x) h^*(x + m) \quad (9)$$

where * is the complex conjugate. Equation (8) may be re-written as a sum of three correlations according to Equation (10) below:

$$e(x_0, y_0) = (\alpha_1 f_1^2 \otimes \alpha_2 - 2\alpha_1 f_1 \otimes \alpha_2 f_2 + \alpha_1 \otimes f_2^2 \alpha_2)(x_0, y_0) \quad (10)$$

The alpha-masked correlation value $e(x_0, y_0)$ is often normalized by the number of terms used in the calculation of the error function at each translation $(x_0, y_0)$ according to Equation (11) as follows:

$$\varepsilon(x_0, y_0) = \left( \frac{\alpha_1 f_1^2 \otimes \alpha_2 - 2\alpha_1 f_1 \otimes \alpha_2 f_2 + \alpha_1 \otimes f_2^2 \alpha_2}{\alpha_1 \otimes \alpha_2} \right)(x_0, y_0) \quad (11)$$

If both images have zero local mean, the first and third terms in Equation (11) approach the variances of the images, which are constant. The second term in Equation (11) constitutes a normalized correlation value according to Equation (12) below:

$$c(x_0, y_0) = \frac{\alpha_1 f_1 \otimes \alpha_2 f_2}{\alpha_1 \otimes \alpha_2}(x_0, y_0) \quad (12)$$

Similar to the case of cross-correlation, the normalized correlation value $c(x_0, y_0)$ is a maximum when the alpha-weighted error function between the two images reaches a minimum. Hence, determining a peak in the normalized correlation between two alpha-masked images is the same as minimising the alpha-weighted error function between the two alpha-masked images.

While the translation between two images can be detected using correlation methods, two images $f_1(x, y)$ and $f_2(x, y)$ may be related by a rotation and a scale transformation, such that image $f_2(x, y)$ is a rotated and scaled version of the image $f_1(x, y)$ according to Equation (13) below:

$$f_2(x,y) = f_1(s(x \cos \theta + y \sin \theta), s(-x \sin \theta + y \cos \theta)) \quad (13)$$

where s is a scale factor and $\theta$ is a rotation angle, the unknown rotation $\theta$ and scale s parameters may be determined by transforming the images $f_1(x, y)$ and $f_2(x, y)$ into a log-polar coordinate space according to Equations (14) below:

$$\rho = \frac{1}{2} \log(x^2 + y^2) \\ \phi = \tan^{-1} \frac{y}{x} \quad (14)$$

The transformation above leads to a relationship between the images $f_1(x, y)$ and $f_2(x, y)$ in the log-polar space according to Equation (15) below:

$$f_2(\rho, \phi) = f_1(\rho + \log s, \phi \theta), \quad (15)$$

The correlation methods described above may then be used to determine the scale and rotation parameters s and $\theta$ from the peak in the correlation C at coordinate (log s, $\theta$).

The two images $f_1(x, y)$ and $f_2(x, y)$ can also be related by a combination of Rotation, Scaling, and Translation (RST) transformation according to Equation (16) below:

$$f_2(x,y) = f_1(s(x \cos \theta + y \sin \theta) + \Delta_x, s(-x \sin \theta + y \cos \theta) + \Delta_y) \quad (16)$$

where s is a scale factor, $\theta$ is a rotation angle, and $(\Delta_x, \Delta_y)$ are translation in x and y directions. The unknown rotation $\theta$ and scale s parameters may be determined from translation invariant representations $T_{f_1}$ and $T_{f_2}$ of the images $f_1(x, y)$ and $f_2(x, y)$, correspondingly. For example, a recombination of the Fourier magnitude |F| and the Laplacian of the Fourier phase $\nabla^2 \phi$ is invariant to any translation applied to the constituting image f according to Equation (17) below:

$$T_f = |F| + iA \nabla^2 \phi \quad (17)$$

where A is a scaling constant set according to Equation (18) below:

$$A = \max(|F|)/\pi \quad (18)$$

to ensure that the recombined Fourier magnitude and phase information are roughly of equal magnitude.

After the rotation $\theta$ and scale s parameters are determined, the image $f_2(x, y)$ can be transformed to correct for the rotation and scaling. The translation parameters $(\Delta_x, \Delta_y)$ can then be estimated from the image $f_1(x, y)$ and the transformed image $f_2(x, y)$ using the previously described correlation methods.

However, the conventional methods of registering images related by translation, rotation and scale, as described above, do not handle modifications across images very well, especially when the modified areas are significant.

SUMMARY OF THE INVENTION

It is an object of the present invention to substantially overcome, or at least ameliorate, one or more disadvantages of existing arrangements.

According to one aspect of the present invention there is provided a method of determining rotation, scale and translation transformation parameters, said method comprising the steps of: determining a plurality of weight values associated with one or more parts of at least one of a first and second image; forming a representation of each of said first and second images using said weight values, the representation being substantially invariant to translation of said first and second images; determining rotation and scale parameters relating said first and second images based on said representation of each of said first and second images; and storing the transformation parameters. According to another aspect of the present invention there is provided an apparatus for determining rotation, scale and translation transformation parameters, said apparatus comprising:

weight value determining module for determining a plurality of weight values associated with one or more parts of at least one of a first and second image;

representation forming module for forming a representation of each of said first and second images using said weight values, the representation being substantially invariant to translation of said first and second images;

parameter determining module for determining rotation and scale parameters relating said first and second images based on said representation of each of said first and second images; and memory module for storing the transformation parameters.

According to still another aspect of the present invention there is provided a computer readable medium, having a program recorded thereon, where the program is configured to make a computer execute a procedure to determine rotation, scale and translation transformation parameters, said program comprising:

code for determining a plurality of weight values associated with one or more parts of at least one of a first and second image;

code for forming a representation of each of said first and second images using said weight values, the representation being substantially invariant to translation of said first and second images;

code for determining rotation and scale parameters relating said first and second images based on said representation of each of said first and second images; and code for storing the transformation parameters.

According to still another aspect of the present invention there is provided a system for determining rotation and scale transformation parameters, said system comprising:

a memory for storing data and a computer program; and a processor coupled to said memory executing said computer program, said computer program comprising instructions for:

determining a plurality of weight values associated with one or more parts of at least one of a first and second image;

forming a representation of each of said first and second images using said weight values, the representation being substantially invariant to translation of said first and second images;

determining rotation and scale transformation parameters relating said first and second images based on said representation of each of said first and second images; and storing the rotation and scale transformation parameters.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
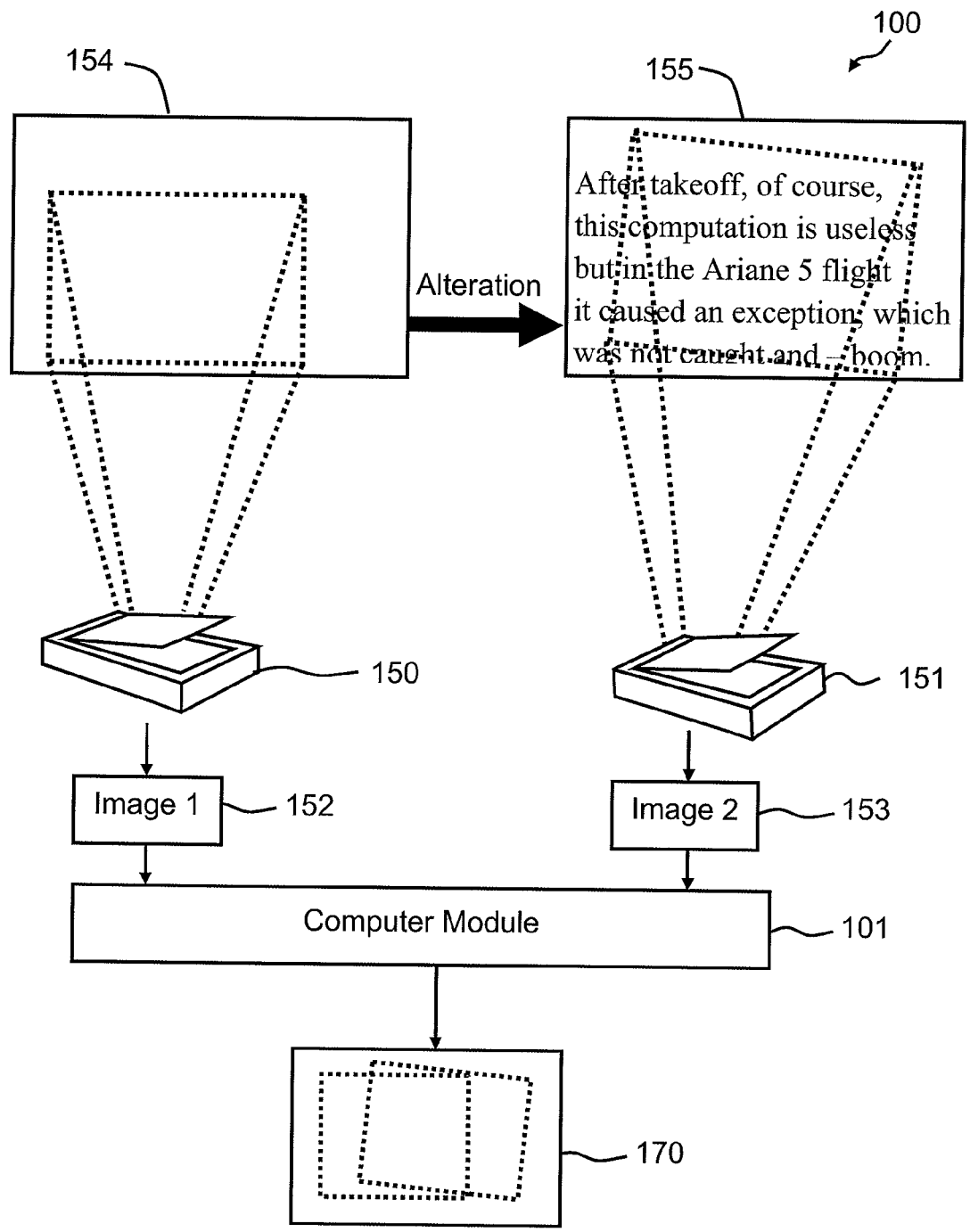
FIG. 1A is a schematic block diagram of a computer system upon which the described embodiments may be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Figure 1B:
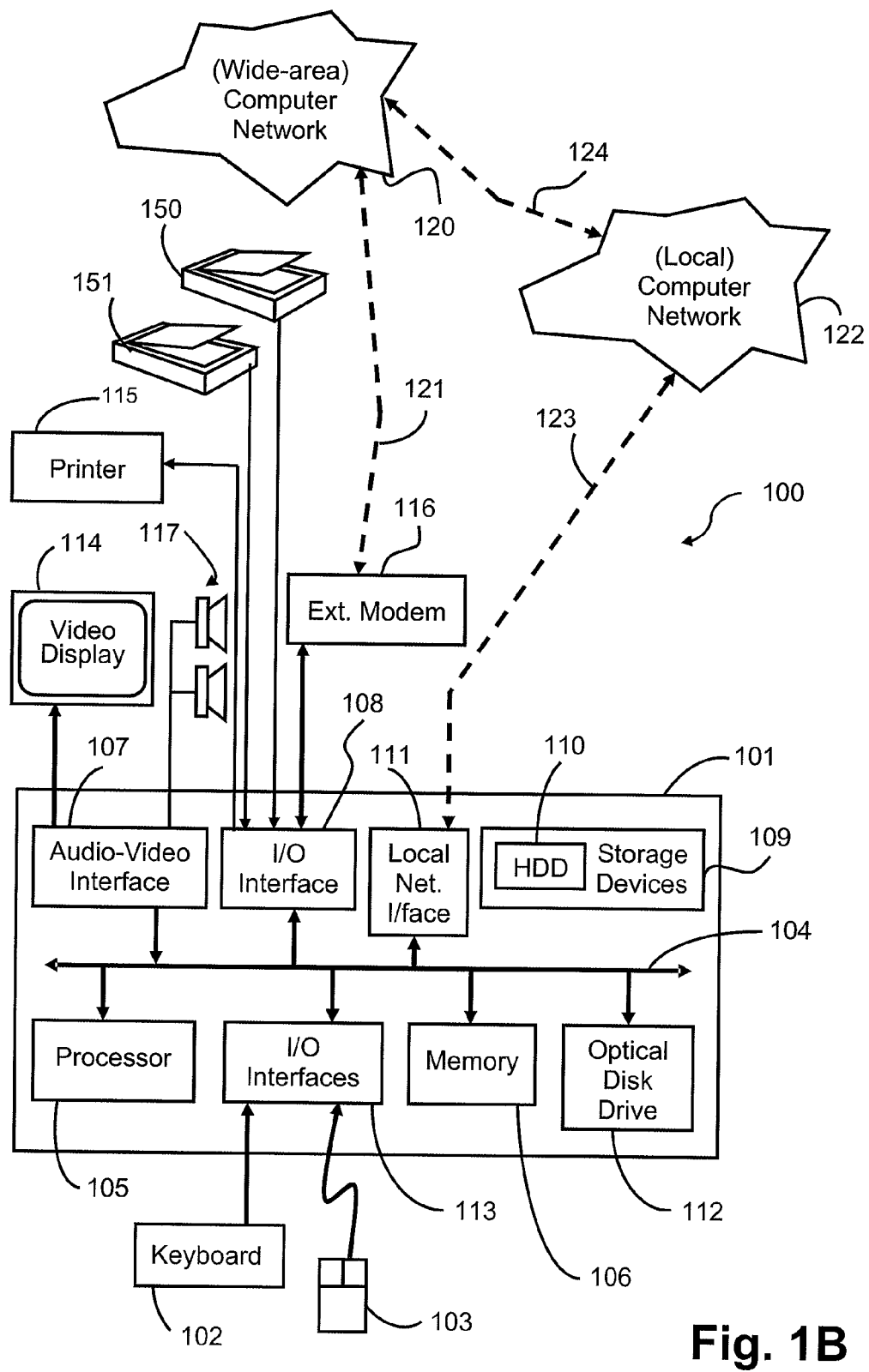
FIG. 1B shows the computer system of FIG. 1A in more detail.

The methods described herein may be implemented using a computer system 100, such as that shown in FIGS. 1A and 1B wherein the processes of FIGS. 2 to 18 may be implemented as software, such as one or more application programs executable within the computer system 100. In particular, the steps of the described methods are effected by instructions in the software that are carried out within the computer system 100. The instructions may be formed as one or more software modules each configured for performing one or more particular tasks. The software may also be divided into separate parts, in which one part and the corresponding software modules make the computer system 100 perform the described methods and another part and the corresponding software modules manage a user interface between the one part and the user.

The software may be stored in a computer readable medium, including the storage devices described below, for example. The software is loaded into the computer system 100 from the computer readable medium, and is then executed by the computer system 100. A computer readable medium having such software or computer program recorded on it is a computer program product. The use of the computer program product in the computer system 100 preferably effects an advantageous apparatus for implementing the described methods.

As seen in FIG. 1B, the computer system 100 is formed by a computer module 101, input devices such as a keyboard 102 and a mouse pointer device 103, and output devices including a printer 315, scanners 150 and 151, and loudspeakers 317. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes a number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality.

The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 110 and are read and controlled in execution by the processor 105. Intermediate storage of such programs and any data fetched from the networks 120 and 122 may be accomplished using the semiconductor memory 306, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The part of the application programs that handles the user interface and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

The described methods may alternatively be implemented in dedicated hardware such as one or more integrated circuits performing the functions or sub functions of the methods. Such dedicated hardware may include graphic processors, digital signal processors, or one or more microprocessors and associated memories.

As seen in FIG. 1A, the scanners 150 and 151 are imaging devices and may be used to produce a first image 152 and a second image 153 of a physical medium 154 with a substantial overlap in image content. The physical medium may be made of paper, cardboard or plastic, for example. The first image 152 and the second image 153 may be a digital image of the physical medium. One or more portions of the second image 153 comprise markings as described below. The first image 152 and second image 153 may be obtained from visual characteristics of a selected area of the physical medium 154.

The original physical medium 154 may be subjected to alteration in between the scans, which results in an altered medium 155. The alteration, such as printing or handwriting, produces different markings on the altered medium 155. The markings may further include intentional or accidental alteration, such as, for example, manual annotations, signatures, stains, crushing, stamping, signing, stapling, binding, sealing and truncating.

The two images 152 and 153 are used as input to the computer module 101 which may be considered to be an "alpha-masked RST image registration apparatus". The computer module 101 may be used to implement a method 200 (see FIG. 2) of registering images, which substantially aligns the two images 152 and 153 by removing any translation, scaling and rotation (RST) that relate the two images. The method 200 outputs a set of RST transformation parameters 170 that substantially aligns the images 152 and 153.

The method 200 of registering images will now be described in detail with reference to FIG. 2. The method 200 may be implemented as software resident on the hard disk drive 110 and being controlled in its execution by the processor 105. The method 200 may be used to register the images 152 and 153 produced by the scanners 150 and 151, respectively, before outputting the RST transformation parameters 170. The image 152 will be referred to below as a "reference" image and the image 153 will be referred to as a "candidate image".

The method 200 begins at step 201 where the reference image 152 and the candidate image 153 are received by the processor 105. Upon being received by the processor 105, the images 152 and 153 may be stored in memory 106 or the hard disk drive 110. At the next step 203, the processor 105 determines an alpha mask $a_1$ and $a_2$ from each of the reference image 152 and the candidate image 153, respectively, and stores the alpha masks $a_1$ and $a_2$ in the memory 106. Each alpha mask $a_1$ and $a_2$ is a non-negative-valued image $\alpha(x, y) \in [0,1]$. The first alpha mask $a_1$ comprises a weight value for each pixel of the reference image 152, and the second alpha mask $a_2$ comprises a weight value for each pixel of the candidate image 153. An alpha mask value of zero (0) at a particular pixel position in the alpha mask signifies that the pixel at that position in the associated image is removed from consideration when determining the RST transformation parameters 170.

In the case that the images 152 and 153 represent documents, for example, the alpha masks, $a_1$ and $a_2$, can be determined by applying a threshold to the images 152 and 153, respectively. These alpha masks, $a_1$ and $a_2$, are intended to capture the pixels potentially covered with toner, or some other markings. Each pixel of the input images 152 and 153 with a value lower than, or equal to, a predetermined threshold is assigned a value of zero (0) in the corresponding alpha mask. Similarly, each pixel of the input images 152 and 153 with a value greater than this threshold is assigned a value of one (1) in the corresponding alpha mask. The threshold value may be arbitrarily set to one hundred and fifty (150), with reference to the common level of grey scale.

Figure 3A:
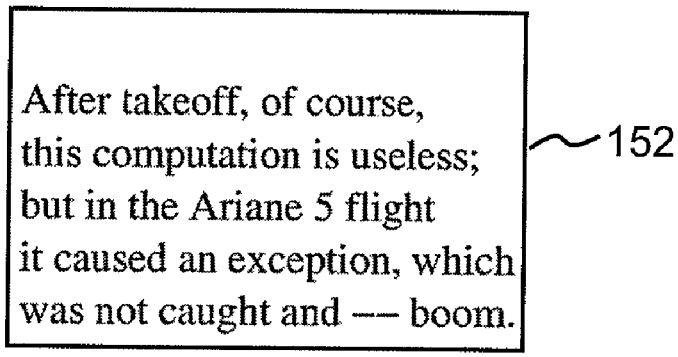
FIG. 3A shows an example input image.
Figure 3B:
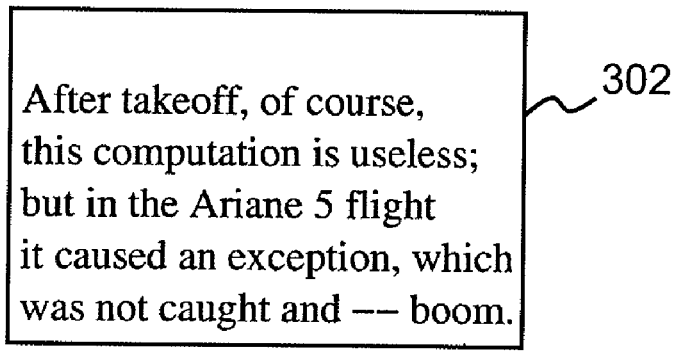
FIG. 3B shows a binary image produced from the example input image of FIG. 3A.

FIG. 3A shows an example input grey image corresponding to the reference image 152, and FIG. 3B shows a binary image 302 produced from the example input image 152. Toner along edges of a printed pattern is typically non-linearly distributed at a microscopic level. This may create a shadow effect in areas around printed patterns. The level of grey of pixels in these areas is likely to be above the above predetermined threshold which results in such pixels being assigned a value of one (1). In order to include the areas around the printed patterns in the respective alpha masks $a_1$ and $a_2$ by assigning a value of zero (0) to those pixels, a binary dilation (also known as Minkowski addition) is applied to dilate areas of value zero (0) in each binary image. The resulting alpha masks $a_1$ and $a_2$ represent printed parts wider than their true width in order to include surrounding grey pixels into the masks $a_1$ and $a_2$.

Figure 3C:
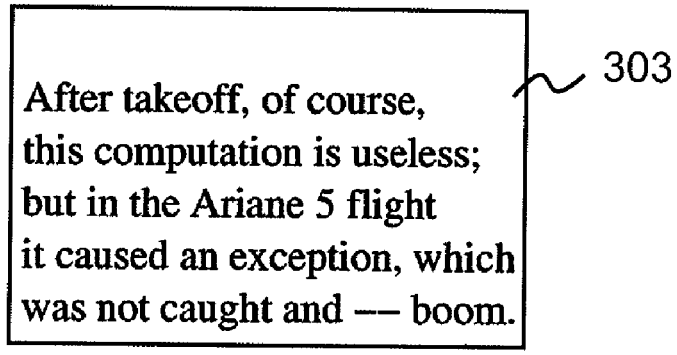
FIG. 3C shows an alpha mask produced by binary dilation of the binary image of FIG. 3B.
Figure 4A:
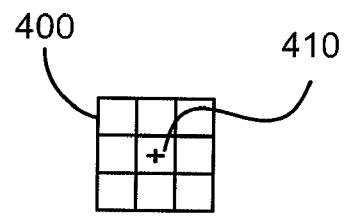
FIG. 4A shows a structuring element used in the method of FIG. 2.
Figure 4B:
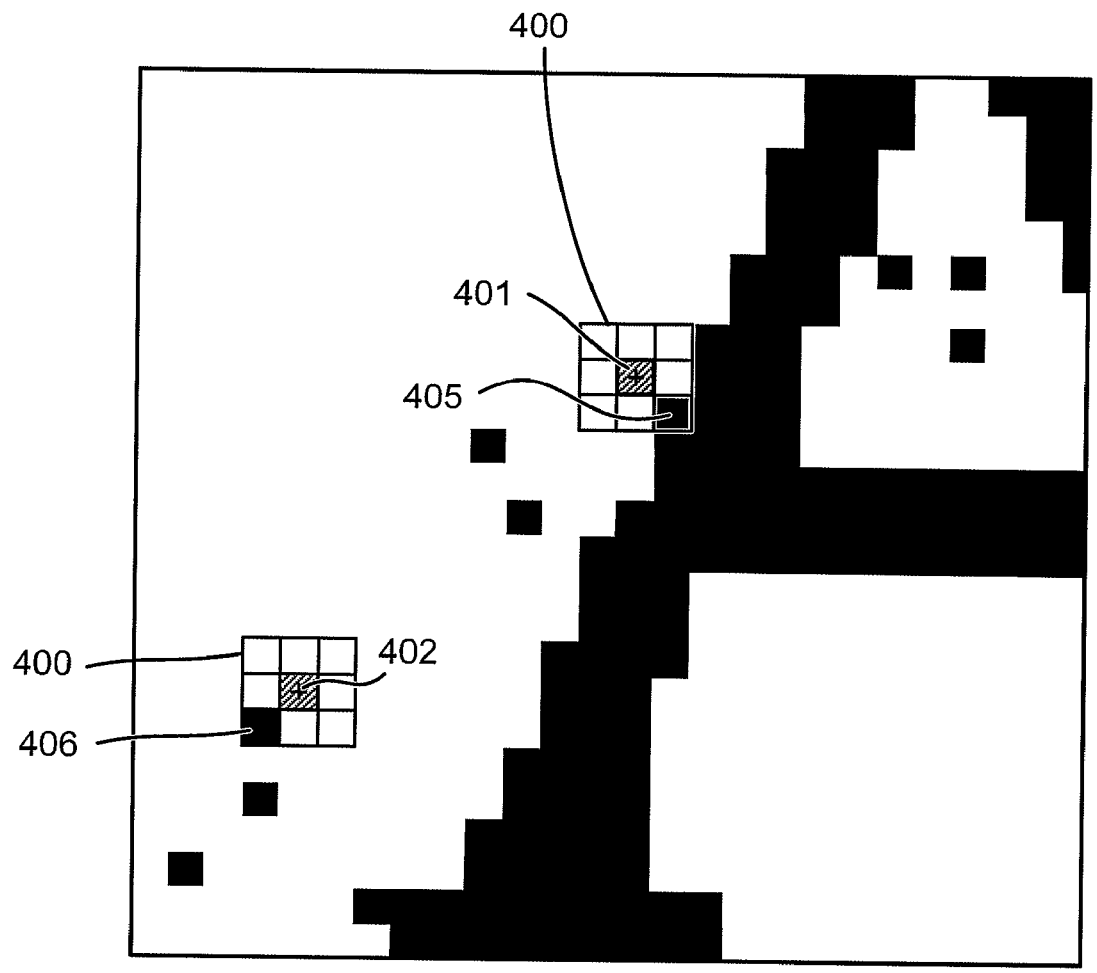
FIG. 4B shows an example of the use of the structuring element of FIG. 4A.
Figure 5:
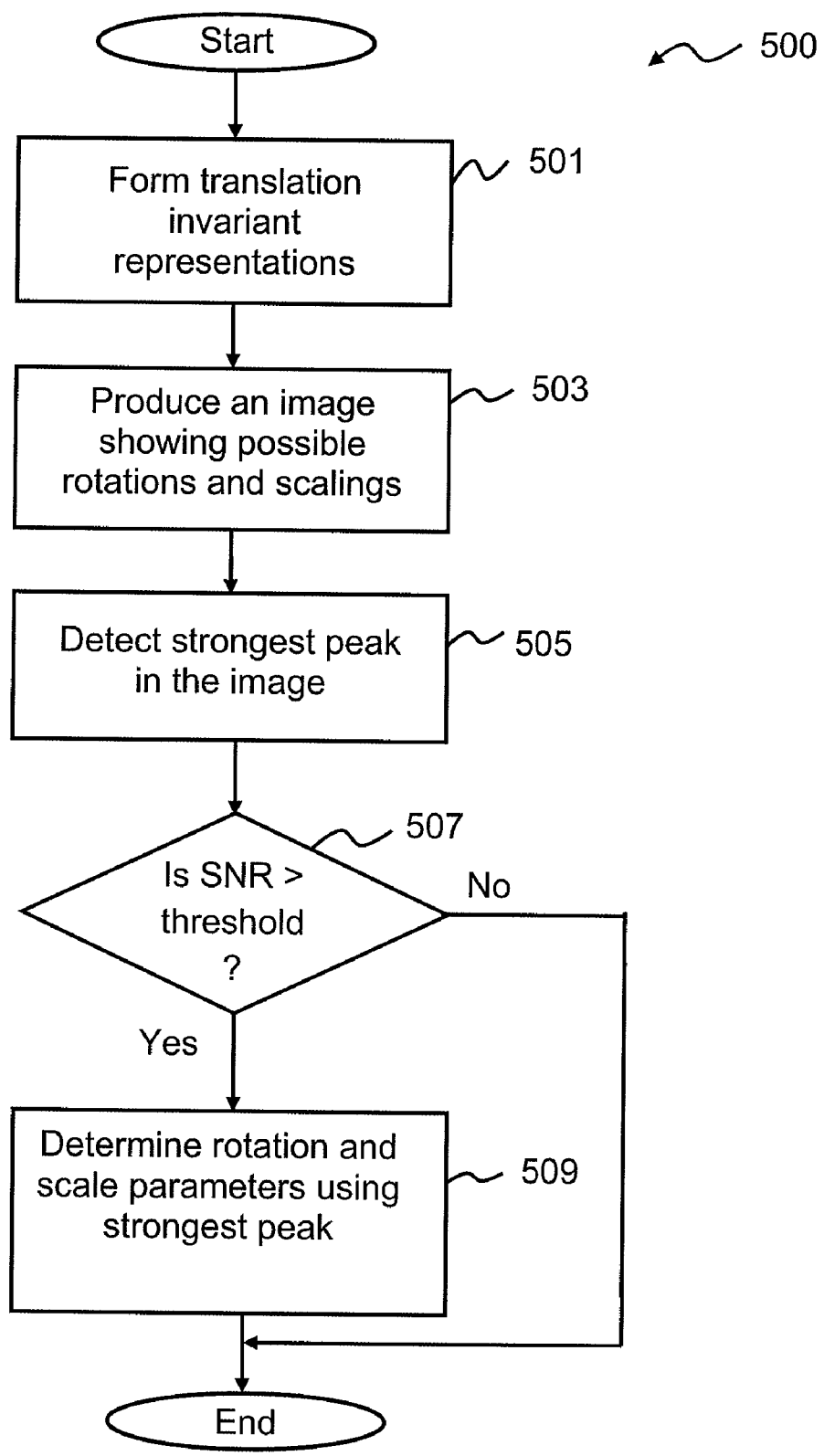
FIG. 5 is a flow diagram illustrating a method of determining rotation and scale parameters relating two images as executed in the method of FIG. 2.

In the exemplary embodiment, the structuring element B is a square 3×3 pixel grid 400 covering eight (8) pixels around an origin 410, as shown in FIG. 4A. By scanning each of the images 152 and 153 with the square 3×3 pixel grid 400, for each position of the origin 410, if a black pixel (i.e., pixel with value zero (0)) appears in the grid 400, then the resulting pixel of the alpha mask corresponding with the origin 410 is set to zero (0). For instance, as shown in FIG. 4B, when the origin 410 of the structuring element 400 is located at position 401, the pixel at position 401 is set to zero (0) because a black pixel 405 appears in the structuring element 400. When the origin 410 is located in position 402, the pixel at position 402 is also set to zero (0) because a black pixel 406 appears in the structuring element 400. FIG. 3C shows the alpha mask 303 produced by binary dilation from the example binary image 302 shown in FIG. 3B.

At the completion of step 203, the alpha masks $a_1$ and $a_2$ are determined. As described above, alpha masks $a_1$ and $a_2$ comprise a value of zero (0) or one (1) for every pixel of the reference image 152 and the candidate image 153, respectively. As will be described below, pixels in the images 152 and 153 with an alpha mask value of zero (0) associated therewith will be ignored in the determination of the RST transformation parameters 170.

Various other methods may be used to produce the alpha masks $a_1$ and $a_2$. For example, different structuring elements may be used. Also, mathematical morphology processing or image filtering methods may be used to determine the alpha masks $a_1$ and $a_2$ from the images 152 and 153. The alpha masks $a_1$ and $a_2$ may alternatively be determined based on the output of an optical character recognition system. Less sophisticated alpha masks $a_1$ and $a_2$ may simply use polygons bounding the printed areas.

The above described alpha masks $a_1$ and $a_2$ are binary. Non-binary alpha masks $a_1$ and $a_2$ having fractional values between zero (0) and one (1) may also be used to associate a degree of influence with each pixel of the images 152 and 153. In this instance, a non-binary dilation may be applied. The values of the non-binary alpha masks $a_1$ and $a_2$ may, for example, be a function of estimated distance to the border of a dilated area.

The method 200 continues at the next step 205, where the processor 105 performs the step of determining rotation and scale parameters relating the reference image 152 and the candidate image 153. During step 205, the alpha masks $a_1$ and $a_2$ are used to control the level of influence attributed to the pixels of the images 152 and 153. The rotation and scale parameters determined at step 205 are stored in the memory 106. A method 500 of determining the rotation and scale parameters that relate two images (i.e., the reference image 152 and the candidate image 153), as executed at step 205, will be described in more detail below with reference to FIG. 5.

The method 200 concludes at the next step 207, where for each set of possible rotation and scale parameters (θ, s), a pair of translation parameters (Δ$_x$, Δ$_y$) is determined to maximize the match strength of the two images 152 and 153 after alignment. Also at step 207, the processor 105 performs the step of selecting the final rotation, scale and translation parameters 170 that yield a highest overall match strength. The pairs of translation parameters (Δ$_x$, Δ$_y$) determined at step 207 is stored in the memory 106.

The method 500 of determining the rotation and scale parameters that relate the reference image 152 to the candidate image 153, as executed at step 205, will now be described in more detail. The method 500 may be implemented as software resident in the hard disk drive 110 and being controlled in its execution by the processor 105.

The method 500 begins at the first step 501, where the processor 105 performs the step of forming a representation of each alpha-masked image, 152 and 153, using the weight values associated with the corresponding alpha masks a$_1$ and a$_2$. The alpha-masked images 152 and 153 are accessed by the processor 105, at step 205, from the memory 106. Each of the representations is substantially invariant to translation of the images 152 and 153. The translation invariant representations may be formed by processing the image 152 with its mask a$_1$ and the image 153 with its mask a$_2$ in a pair-wise manner. This processing may be performed using a translation invariant generator. A method 700 of forming a translation invariant representation of an alpha-masked image (e.g., (252, a$_1$)), as executed at step 501, will be described in detail below with reference to FIG. 7. As described below, in the method 700, the processor 105 performs normalized autocorrelation on the image (e.g., 152) using the weight values associated with the corresponding alpha mask to form a translation invariant representation. An alternative method 800 of determining a translation invariant representation of an alpha-masked image, as executed at step 501, will also be described in detail below with reference to FIG. 8.

At the next step 503 of the method 500, the processor 305 performs the step of producing an image in which possible rotations and scalings that relate the images 152 and 153 are represented by isolated peaks. The image may be produced in step 503 by supplying the two translation invariant representations of the alpha-mask images to an alpha-masked Fourier-Mellin correlator. The image determined at step 503 is stored in memory 106. A method 900 of performing alpha-masked Fourier Mellin correlation on the translation invariant representations, as executed at step 503, will be described in detail below with reference to FIG. 9.

Then at the next step 505, the strongest peak in the image of step 503 is detected by the processor 105. The strongest peak may be detected by supplying the resulting image from the Fourier-Mellin correlator to a peak detector, which detects the strongest peak. At the next step 507, if the processor 105 determines that the signal to noise ratio of the detected peak is greater than a predetermined threshold stored in memory 106 or the hard disk drive 110, then the method 500 proceeds to step 509. At step 509, the location of the strongest peak is used to determine the rotation and scale parameters which relate the two images 152 and 153. The predetermined threshold used in the exemplary embodiment is one point five (1.5). The rotation and scale parameters determined at step 509 are stored in memory 106 or on the hard disk drive 110.

If the signal to noise ratio of the peak detected by the peak detector is less than the predetermined threshold at step 507, then the processor 105 concludes that the images 152 and 153 are not related by a rotation and scale and the method 500 concludes.

Figure 6:
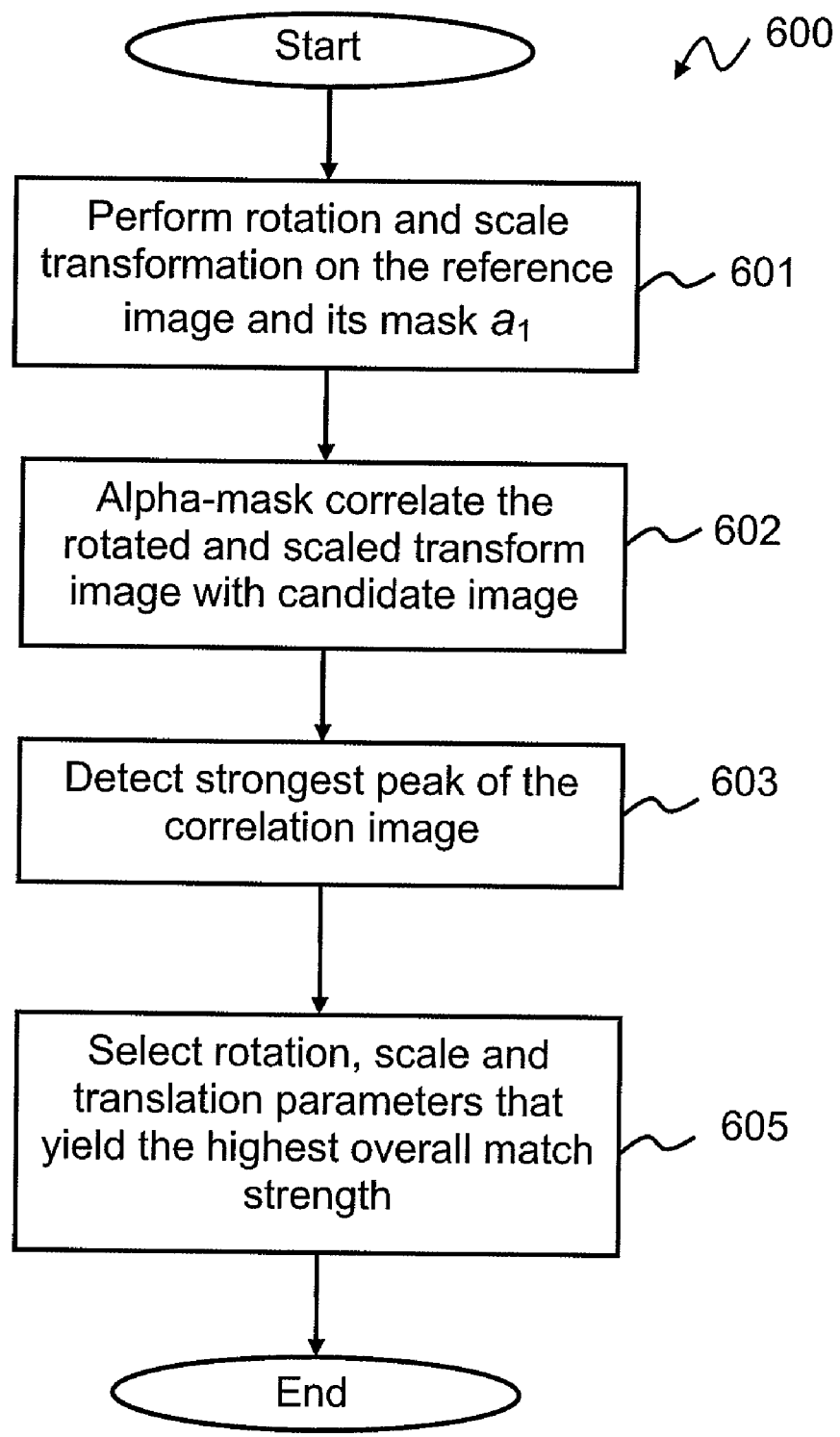
FIG. 6 is a flow diagram illustrating a method of selecting rotation, scale and translation parameters as executed in the method of FIG. 2.

The method 600 of selecting rotation, scale and translation parameters, as executed at step 207, will be described in detail below with reference to FIG. 6. In the method 600, the translation parameters that relate the reference image 152 and the candidate image 153 are determined given an estimate of the rotation and scale parameters. The method 600 may be implemented as software resident in the hard disk drive 110 and being controlled in its execution by the processor 106.

The method 600 begins at step 601, where the rotation and scale transformations, determined in step 607 of the method 600, are performed by the processor 105 on the reference image 152 and the alpha mask a$_1$, thereby undoing those transformations. At the next step 602, the rotated and scaled transformed image 152 and its transformed mask are alpha-masked correlated with the image 153 and the mask a$_2$ to produce another correlation image. The position of a magnitude peak in this correlation image will generally correspond to the translation relating the transformed image 152 and image 153.

Then at the next step 603, the processor 105 detects the location of the strongest peak within the correlation image of step 602. The magnitude of the strongest peak is the match strength value of the two input alpha-masked images (152, a$_1$) and (153, a$_2$). The method 600 concludes at the next step 605, where the processor 105 performs the step of selecting translation parameters that yield the highest overall match strength.

Figure 7:
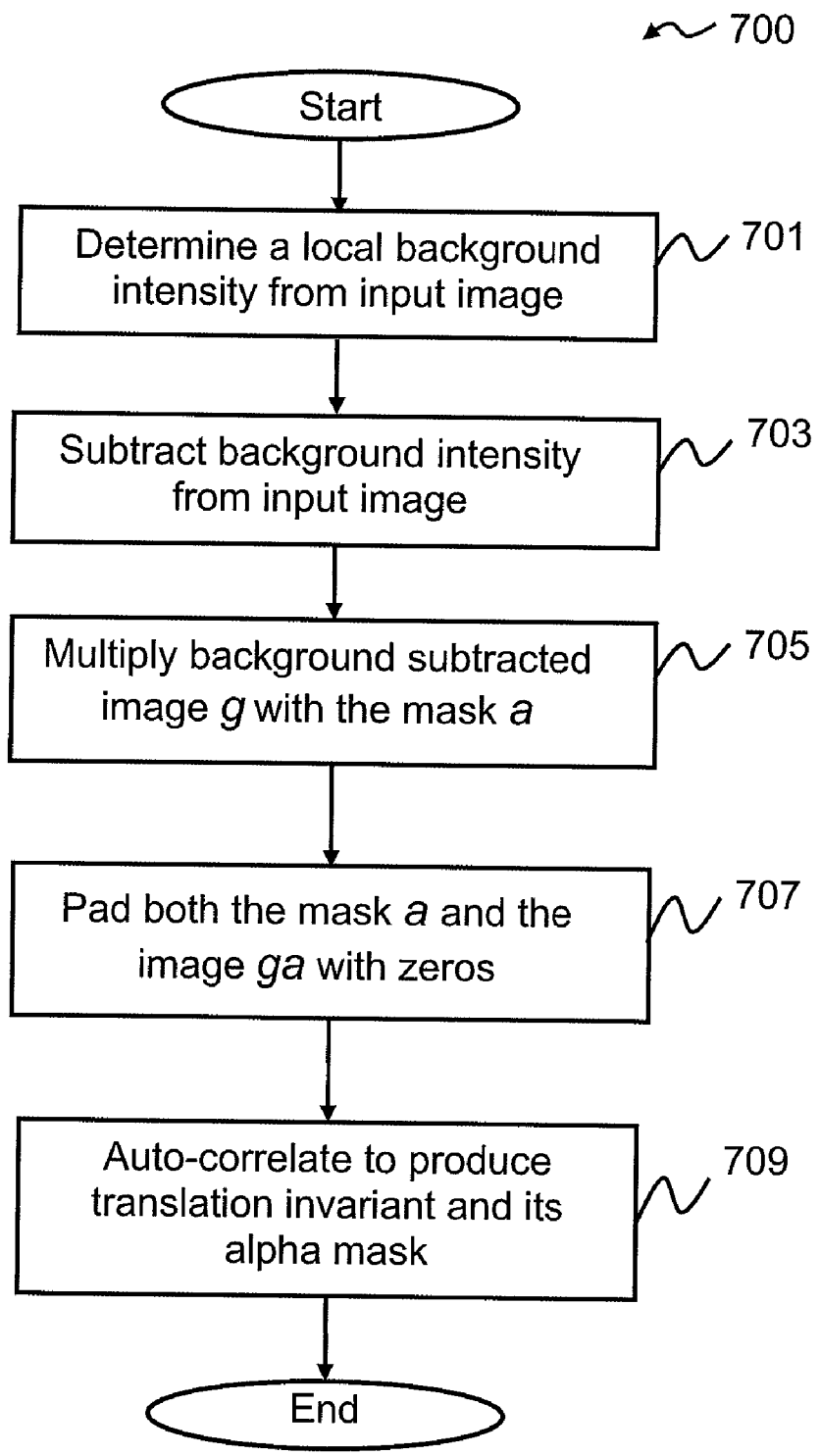
FIG. 7 is a flow diagram illustrating a method of forming an alpha-masked translation invariant representation of an alpha-masked image as executed in the method of FIG. 5 according to one embodiment.

The method 700 of determining a translation invariant representation of an alpha-masked image (e.g., (152, a$_1$)), as executed at step 501, will now be described in detail with reference to FIG. 7. The method 700 may be implemented as software resident in the hard disk drive 110 and being controlled in its execution by the processor 105. The method 700 will be described with reference to the reference image 152 and the alpha mask a$_1$. However, the method 700 may be applied to any image and corresponding alpha mask.

The method 700 begins at step 701, where a local background intensity is determined from the input image 152 and the alpha mask a$_1$ determined from the image 152.

If f denotes the input image 152 and a denotes the alpha mask a$_1$ corresponding to the input image 152, the background intensity $\bar{f}$ is estimated by normalized convolution in accordance with Equation (19) as follows:

$$\bar{f} = \frac{\text{blur}(f \cdot \alpha)}{\text{blur}(\alpha)} \quad (19)$$

where blur is a low-pass filtering operation and (.) is a pixel-wise multiplication operator. A blurring kernel may be used in the low-pass filtering operation, with the size of the blurring kernel being large enough to filter out high-frequency variation of the image f, while the low-frequency variation of the background intensity is still retained. Preferably a box blur filter may be used with a kernel size N between thirteen (13) and twenty-three (23). A two-dimensional box blur filter may be implemented very efficiently in a separable fashion by implementing two one-dimensional blur filters. Each one dimensional filter produces the sum of N consecutive pixels within a moving window. Since this window is moved across the image only one pixel at a time, the sum of a new window may be determined from the sum of the previous window by subtracting the intensity value of a pixel no longer included in the window, and adding the intensity value of a newly included pixel. In this way, a box filter of arbitrary kernel size N only costs four additions and one multiplication (for normalization) per pixel.

Alternative methods determining local background intensity at step 701, and include for example mathematical morphology operators such as erosion, dilation, opening, and closing.

The method 700 continues at the next step 703, where after the background intensity $\bar{f}$ is determined, the background intensity $\bar{f}$ is subtracted from the input image f by the processor 105 to produce an image with zero local mean $g=f-\bar{f}$.

Then at the next step 705, the background subtracted image is then multiplied by the processor 105 with the mask a to produce image ga. Both the image ga and the alpha mask a are then padded with zeros to twice their size at step 707, before being auto-correlated at step 709 to form the translation invariant image TI and alpha mask mask$_{TI}$ corresponding to the invariant image TI. The translation invariant image TI and the alpha mask mask$_{TI}$ are determined in accordance with Equations (20) and (21), as follows:

$$TI = \frac{\alpha g \otimes \alpha g}{\alpha \otimes \alpha} \tag{20}$$

$$\mathrm{mask}_{TI} = \alpha \otimes \alpha \tag{21}$$

where $\otimes$ is a correlation operator. This correlation may be performed in the spatial domain or through multiplication in the Fourier domain.

Figure 8:
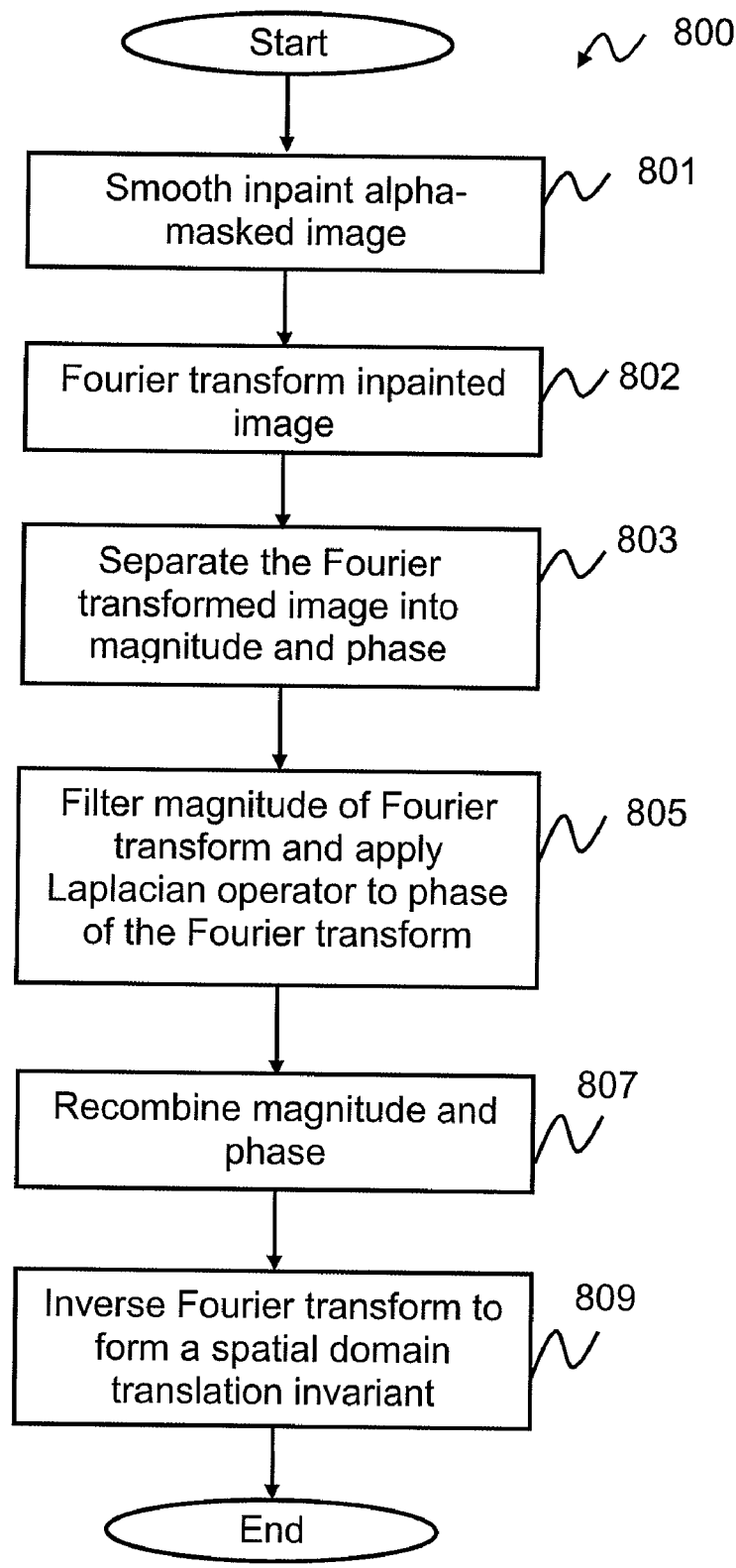
FIG. 8 is a flow diagram illustrating a method of determining a translation invariant representation of an alpha-masked image as executed in the method of FIG. 5, according to a further embodiment.

The alternative method 800 of determining a translation invariant representation of an alpha-masked image, which may be executed at step 501, will now be described in detail with reference to FIG. 8. The method 800 may be implemented as software resident in the hard disk drive 110 and being controlled in its execution by the processor 105. Again, the method 800 will be described with reference to the reference image 152 and its alpha mask $a_1$.

The method 800 begins at step 801, where the image 152 and the alpha mask $a_1$ are subjected to the smooth inpainting, by the processor 105, thereby producing an image with inpainted pixel values under the alpha mask. The image determined at step 801 is stored in the memory 106. A method 1100 of producing an inpainted image, as executed at step 801, will be described in detail below with reference to FIG. 11.

The inpainted image is then Fourier transformed by the processor 105, at step 802, using a fast Fourier transform routine, thereby producing an image consisting of complex values. This image is separated into two images in step 803 consisting of the magnitude of complex values of the Fourier transform and phase of the complex values of the Fourier transform. In the next step 805, the magnitude of the Fourier transform is multiplied by a ramp function, by the processor 105, to perform high-pass filtering of the image consisting of complex values. A Laplacian operator is applied to the phase of the Fourier transform to take the second derivative of the phase, which is a translation invariant.

The method 800 continues at the next step 807, where the processor 105 recombines the modified magnitude of the Fourier transform and the result of taking the Laplacian of the phase from step 805 according to Equation (22) below:

$$|F|+iA\nabla^2\phi \tag{22}$$

where $|F|$ is the magnitude of the Fourier transform, $\nabla^2\phi$ is the Laplacian of the phase of the Fourier transform, and A is a scaling constant set according to Equation (23) below:

$$A=\max(|F|)/\pi \tag{23}$$

The scaling constant A ensures that the recombined Fourier magnitude and phase information is roughly of equal magnitude. Alternatively, the combination of the modified magnitude of the Fourier transform and the result of taking the Laplacian of the phase, may be performed according to Equation (24) below:

$$|F|e^{i\nabla^2\phi} \tag{24}$$

The result of the recombination of the Fourier magnitude and processed Fourier phase is inverse Fourier transformed at the next step 809, thereby producing a spatial domain translation invariant which has superior qualities for the subsequent alpha-masked Fourier-Mellin correlation step for a wide variety of images.

Still other translation invariants of the Fourier magnitude and phase may be used in step 805, such as the modulus squared of the Fourier magnitude or the logarithm of the Fourier magnitude. Still further, the Laplacian of the logarithm of the Fourier transform or operators according to Equations (25) and (26), below, may also be used at step 809:

$$\left(\left(\frac{\partial^2}{\partial x^2}+\frac{\partial^2}{\partial y^2}\right)+i\left(\frac{\partial^2}{\partial x\partial y}+\frac{\partial^2}{\partial y\partial x}\right)\right)(\log F) \tag{25}$$

and $$\left(\left(\frac{\partial^2}{\partial x^2}-\frac{\partial^2}{\partial y^2}\right)+i\left(\frac{\partial^2}{\partial x\partial y}-\frac{\partial^2}{\partial y\partial x}\right)\right)(\log F) \tag{26}$$

where the logarithm of a complex number is defined as according to Equation (27) below:

$$\log F=\log|F|+i\phi \tag{27}$$

The method 800 does not produce an alpha mask mask$_{TI}$ like the method 700. To be compatible with the method 700, mask$_{TI}$ can be set to a unit image of equal size as the translation invariant representation generated by the method 800.

Figure 9:
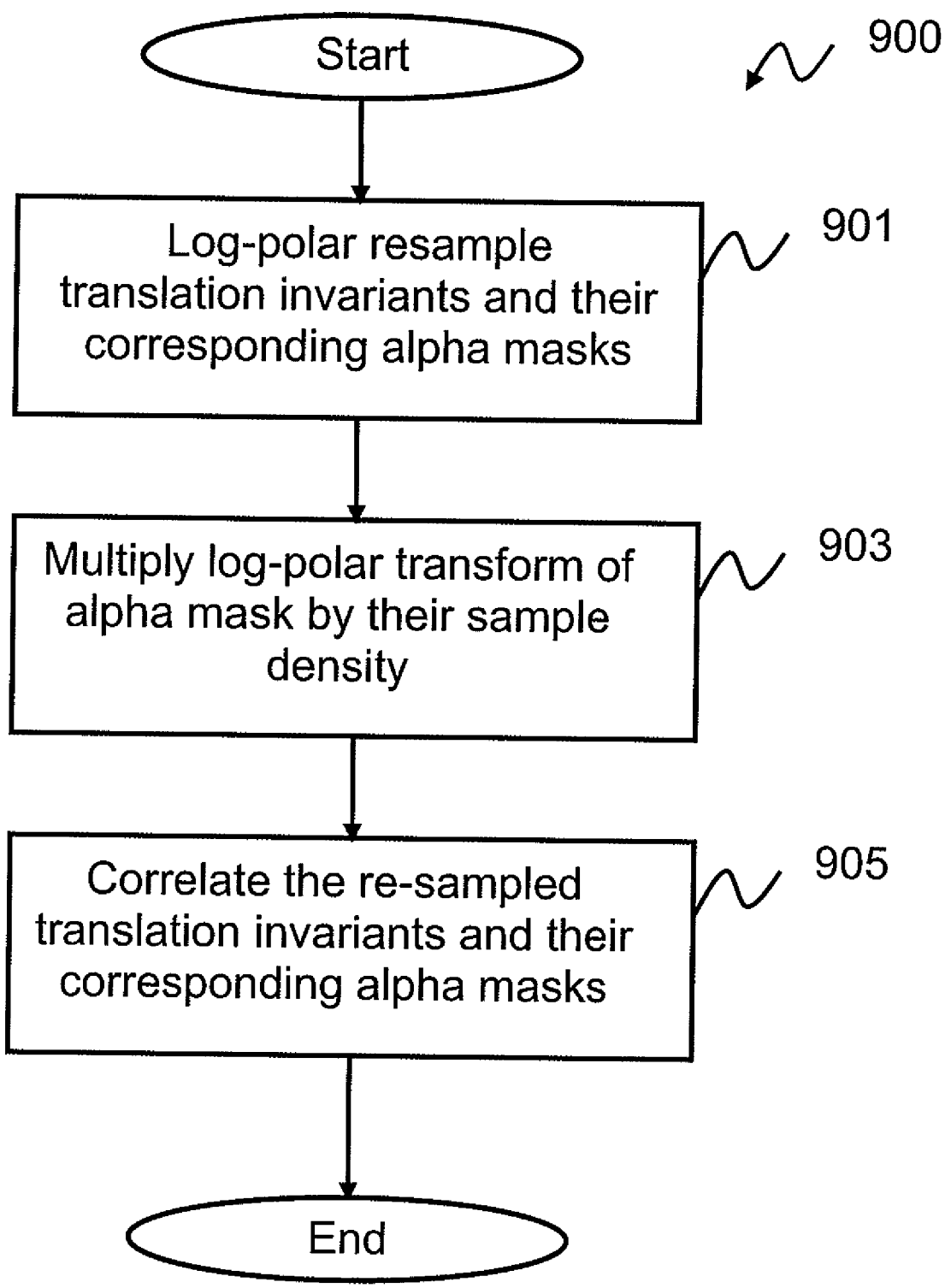
FIG. 9 is a flow diagram illustrating a method of alpha-masked Fourier-Mellin correlation, as executed in the method of FIG. 5.

The method 900 of performing alpha-masked Fourier Mellin correlation on the translation invariant representations, as executed at step 503, will be described in detail below with reference to FIG. 9. The method 900 produces the image in which possible rotations and scalings relating the two images 152 and 153 are represented by isolated peaks. The method 900 may be implemented as software resident in the hard disk drive 110 and being controlled in its execution by the processor 105.

The method 900 begins at step 901, where the translation invariant representations determined in step 501 and their corresponding alpha masks stored in the memory 106 are log-polar re-sampled. To re-sample to the log-polar domain, it is necessary to specify the resolution within that domain. If the translation invariant images are N pixels wide by M pixels high and a given pixel in each of these images is specified by a coordinate pair (i, j), where i can vary between 0 and N−1 and j can vary between 0 and M−1, then the centre of the translation invariant images is located at $(c_x, c_y)=(\mathrm{floor}(N/2), \mathrm{floor}(M/2))$. Log-polar resampling to an image P pixels by Q pixels in log-polar space is performed relative to this centre of the translation invariant images. To avoid a singularity at the origin, a disc of radius $r_{min}$ pixels around the centre of the translation invariant image is ignored. Ignoring this disc, the point in the log-polar plane described by pixel location (j, k)

is determined by interpolating the translation invariant image at the point defined by Equation (28) below:

$$x = c_x + \cos\frac{2\pi k}{Q} r_{min} e^{aj} \qquad (28)$$

$$y = c_y + \sin\frac{2\pi k}{Q} r_{min} e^{aj}$$

where $$a = \frac{\log(r_{max}/r_{min})}{P-1} \qquad (29)$$

and $$r_{max} = \max(M/2, N/2) \qquad (30)$$

where $r_{max}$ denotes the maximum radius in the translation invariant domain to which the log-polar image extends. Common values of the constants in the above equations are P=Q=(M+N)/2, and $r_{min}$=5.

The method 900 continues at the next step 903, where the processor 105 multiplies the log-polar transform of the alpha masks, corresponding to the translation invariants, by their sample density in the log-polar domain. The results of step 903 are stored in the memory 106 and used as alpha masks in the next step 905. At step 905, the processor 105 correlates the re-sampled translation invariants and their corresponding alpha masks to produce an alpha-masked Fourier-Mellin correlation image and corresponding alpha mask. If the input images 152 and 153 are related by a rotation and scale, then a peak will generally appear in this Fourier-Mellin correlation image at a location related to the scale factor and rotation angle relating the images. The output mask produced at step 905 is used to reject peaks with small alpha mask value, which correspond to a small overlap between the alpha-masked translation invariant images.

Figure 10:
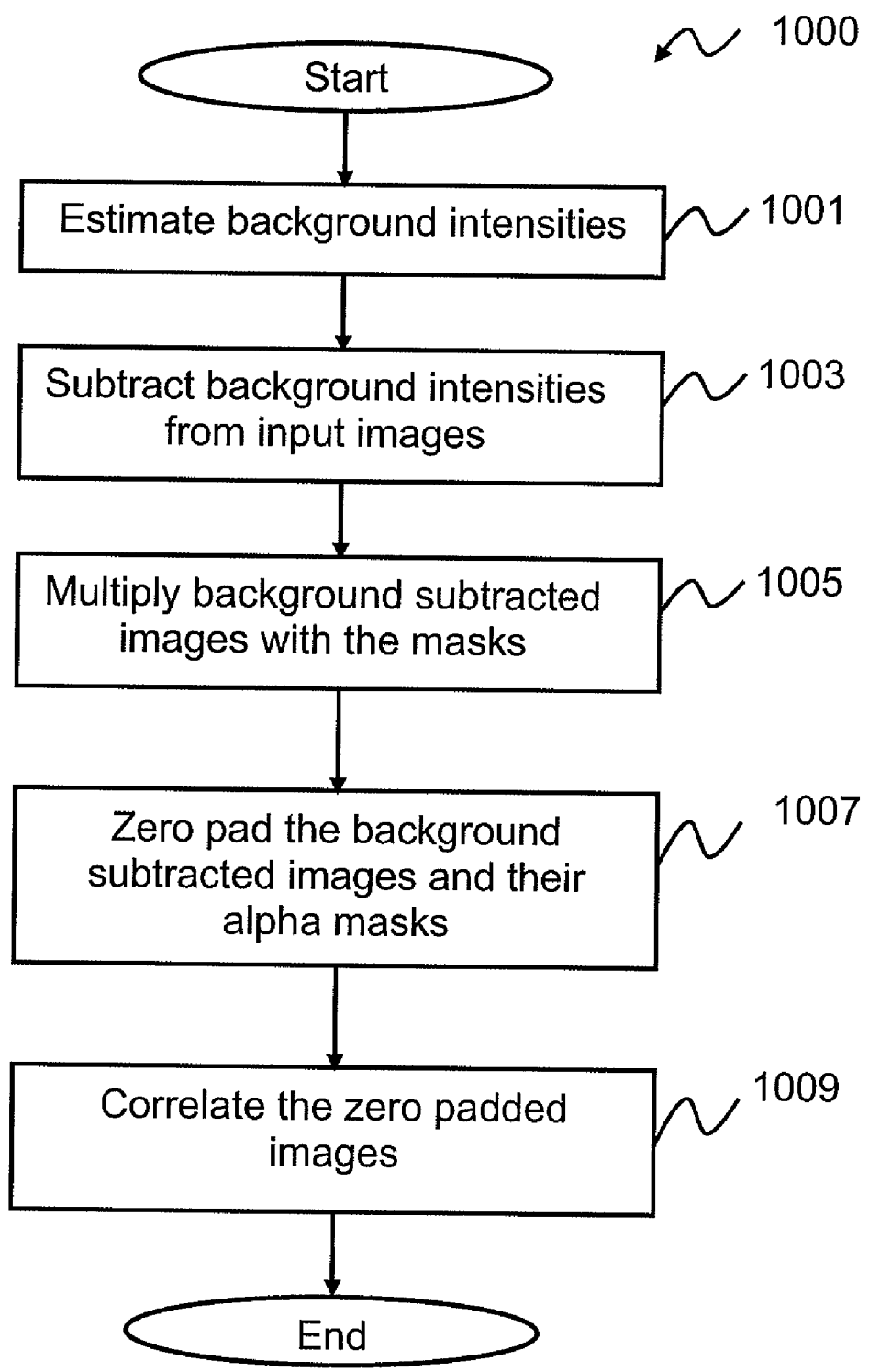
FIG. 10 is a flow diagram illustrating a method of alpha-masked correlation as executed in the method of FIG. 6.

A method 1000 of alpha-mask correlation, as executed at step 905, will now be described in detail below with reference to FIG. 10. The method 1000 may be implemented as software resident in the hard disk drive 110 and being controlled in its execution by the processor 105.

The method 1000 begins at step 1001, where the background intensities $\bar{f}_1$ and $\bar{f}_2$ of the alpha-masked images ($f_1$, $a_1$) and ($f_2$, $a_2$), produced in step 903, are determined in the processor 105 in a similar manner to step 701 of the method 700. The method 1000 continues at the next step 1003, where after the background intensities $\bar{f}_1$ and $\bar{f}_2$ are determined, the background intensities $\bar{f}_1$ and $\bar{f}_2$ are subtracted from the input images $f_1$ and $f_2$, respectively, to produce images with zero local mean $g_1=f_1-\bar{f}_1$ and $g_2=f_2-\bar{f}_2$. Then at the next step 1005, the zero local mean images are then multiplied by the processor 105 with the masks $a_1$, $a_2$ stored in the memory 106 to produce background subtracted images $g_1a_1$ and $g_2a_2$.

Then at the next step 1007, the background subtracted images and their alpha masks ($g_1a_1$, $a_1$) and ($g_2a_2$, $a_2$) are optionally zero padded to twice their size before being correlated in step 1009 to produce the alpha-masked correlation result e and its alpha mask $mask_e$ in accordance with Equations (31) and (32) below:

$$\varepsilon = \frac{\alpha_1 g_1 \otimes \alpha_2 g_2}{\alpha_1 \otimes \alpha_2} \qquad (31)$$

$$mask_\varepsilon = \alpha_1 \otimes \alpha_2 \qquad (32)$$

where $\otimes$ is a correlation operator. This correlation may be performed in the spatial domain according to Equation (33) below:

$$(f_1 \otimes f_2)(x_0, y_0) = \sum_{x,y} f_1(x,y) f_2(x-x_0, y-y_0) \qquad (33)$$

or through multiplication in the Fourier domain.

Figure 11:
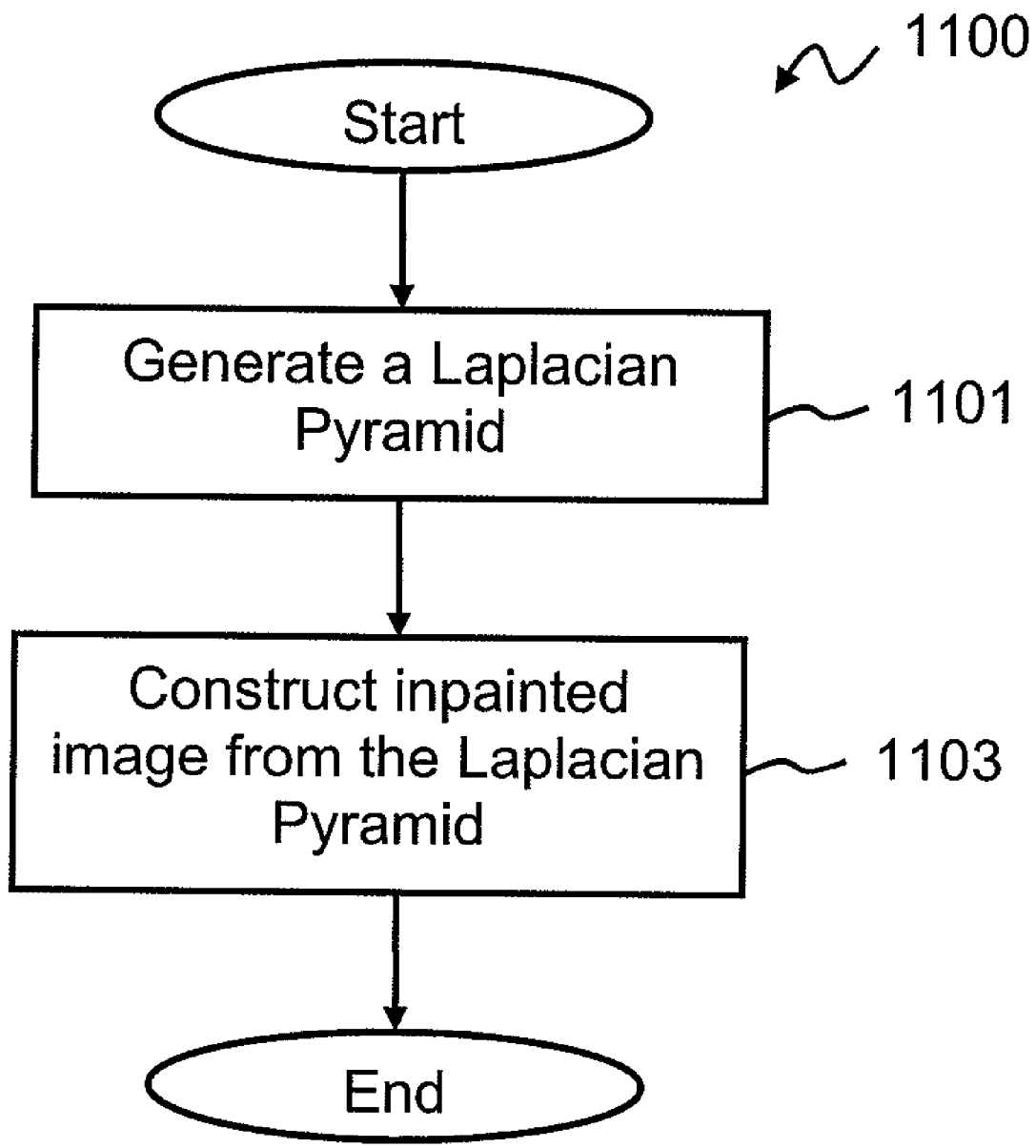
FIG. 11 is a flow diagram illustrating a method of producing a smooth inpainting image as executed in the method of FIG. 8.

The method 1100 of producing a smooth inpainted image, as executed at step 801, will now be described in detail with reference to FIG. 11. The method 1100 may be implemented as software resident in the hard disk drive 110 and being controlled in its execution by the processor 105.

The method 1100 begins at the first step 1101, where the image 152 and its alpha mask $a_1$ are used to generate a Laplacian pyramid. A method 1700 of generating a Laplacian pyramid, as executed at step 1101, will be described in detail below with reference to FIG. 17.

At the next step 1103 of the method 1100, an inpainted image is constructed from a Laplacian pyramid. The inpainted image no longer requires an associated alpha mask because masked out pixels are filled with intensities from surrounding valid pixels. In particular, at step 1103, the processor 105 performs the step of replacing intensities of pixels with low weight values by a combination of intensities of surrounding pixels with high weight values. A method 1800 of constructing an inpainted image from a Laplacian pyramid, as executed at step 1103, will be described in detail below with reference to FIG. 18.

Figure 17:
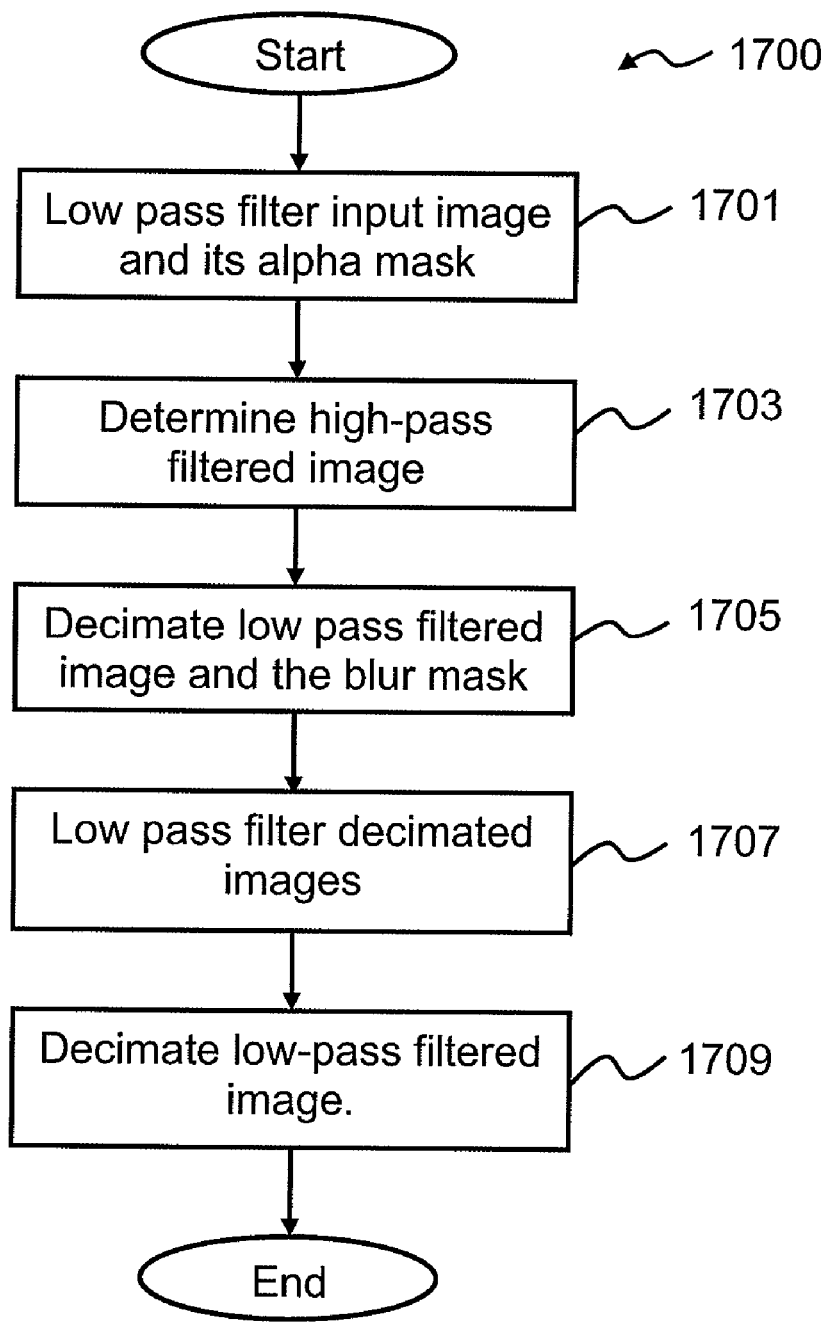
FIG. 17 is a flow diagram showing a method of generating a Laplacian pyramid from an alpha-masked image, as executed in the method of FIG. 11.

The method 1700 of generating a Laplacian pyramid, as executed at step 1101, will be described by way of example below with reference to FIGS. 12 and 17. The method 1700 may be implemented as software resident in the hard disk drive 110 and being controlled in its execution by the processor 105.

The method 1700 begins at step 1701, where the input image $f_1$ 152 and its alpha mask $a_1$ 1701 are low-pass filtered with a Normalized Convolution (NC) operator that ignores the contribution of pixels under the mask, in accordance with Equations (34) and (35) below:

$$l_i = \frac{\mathrm{blur}(\alpha_i \cdot f_i)}{\mathrm{blur}(\alpha_i)} \qquad (34)$$

$$\beta_i = \mathrm{blur}(a_i) \qquad (35)$$

where i=1, 2, . . . , blur is a low-pass filtering operation. blur is preferably a Gaussian blur with a scale of one (1) pixel, and (.) is a pixel-wise multiplication operator, to produce a low pass filtered image $l_1$ 1201 and a blur mask $\beta_1$ 1202.

At the next step 1703, the processor 105 determines a high-pass filtered image $h_1$ 1203 from the input image $f_1$, its mask $a_1$, and the low-pass filtered image $l_1$ in accordance with the Equation (36):

$$h_i = (f_i - l_i) \cdot a_i \qquad (36)$$

The method 1700 continues at the next step 1705, where the low pass filtered image $l_1$ 1201 and the blur mask $\beta_1$ 1202 are decimated by the processor 105 to produce a decimated image $f_2$ 1204 and a decimated mask $a_2$ 1205 which are stored in the memory 106. Then at the next step 1707, the image $f_2$ and its alpha mask $a_2$ are low-pass filtered with a Normalized Convolution (NC) operator, in accordance with Equations (35) and (36), to produce a low-pass filtered image $l_2$ 1206 and a high-pass filtered image $h_2$ 1207. The method 1700 concludes at the next step 1709 where the low-pass filtered image $l_2$ 1206 is decimated to produce an image $f_3$ 1209 which is also stored in the memory 106.

Figure 12:
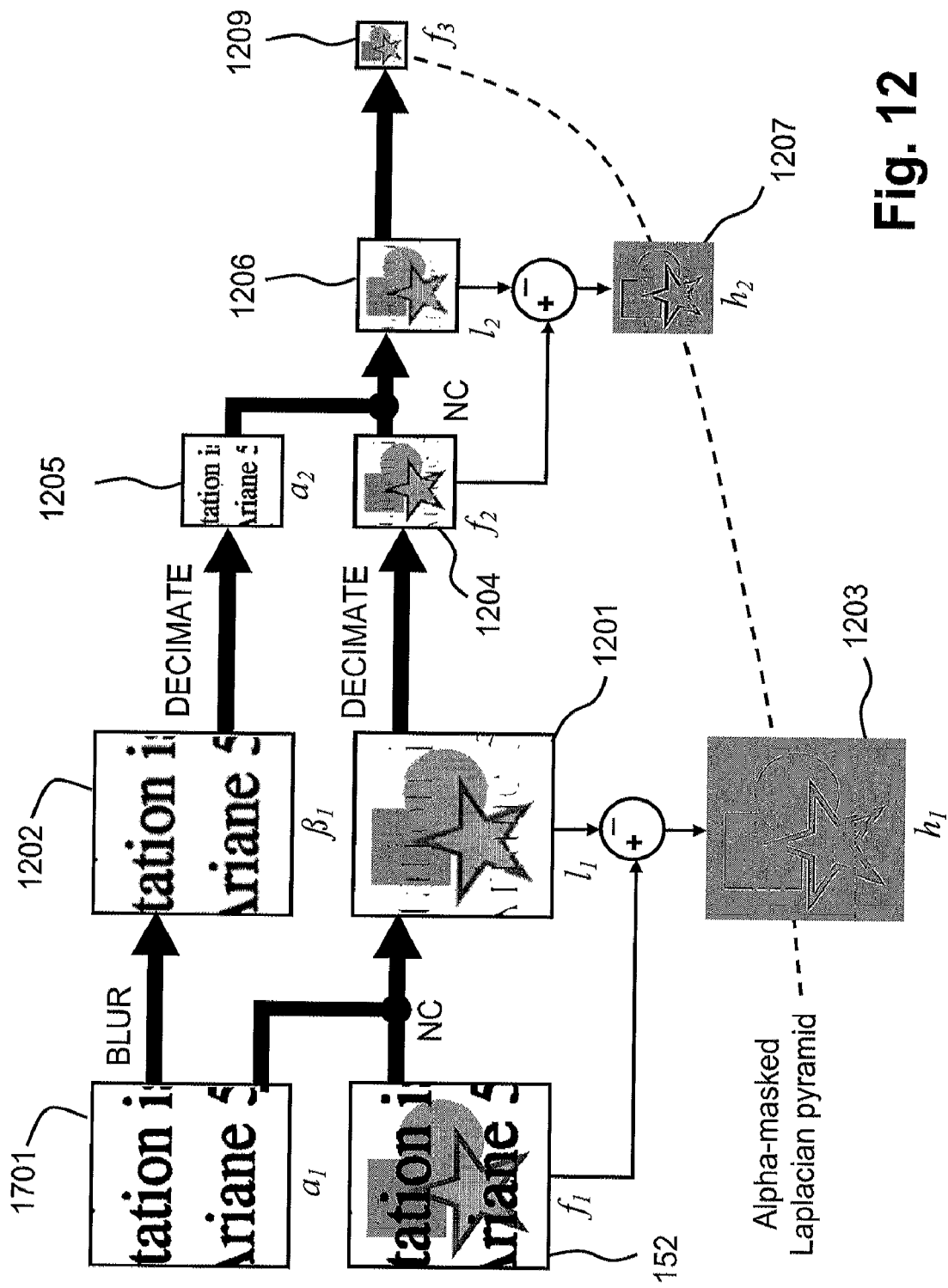
FIG. 12 shows an example of an image and its alpha mask being processed in accordance with the method of FIG. 17.

As connected by the dash line in FIG. 12, a Laplacian pyramid is a collection of high-pass filtered images, each being half the size of the previous image. The number of pyramid levels (e.g., three levels in FIG. 12) can either be defined by the user or automatically set to a maximum allowable value:

$$N = \log_2(\min(W,H)) \quad (37)$$

where W and H are the width and height of the input image $f_i$. At a topmost level, the Laplacian pyramid also stores within the memory 106 an intensity image 1209 at half the size of the smallest high-pass filtered image to facilitate subsequent image reconstruction. If the number of pyramid levels is set to the maximum allowable value above, the image at the topmost level has either a width of one (1) pixel or a height of one (1) pixel or both.

The Laplacian pyramid as shown in FIG. 12 is a lossless representation of the input image 152 if the decimate operations, executed at step 1705, are lossless. The decimate operations are lossless if the low-pass filtered images $l_1$ and $\beta_1$ are band-limited to half of their Nyquist frequency. To avoid the requirement that the low-pass filtered images $l_1$ and $\beta_1$ are lossless, the Laplacian image $h_i$ is preferably generated by subtracting a bi-linearly upsampled version of image $f_{i+1}$ from image $f_i$ in accordance with Equation (38) below:

$$h_i = (f_i - \{f_{i+1}\}\uparrow) \cdot a_i \quad (38)$$

where $\uparrow$ is the upsampling operator.

Figure 13:
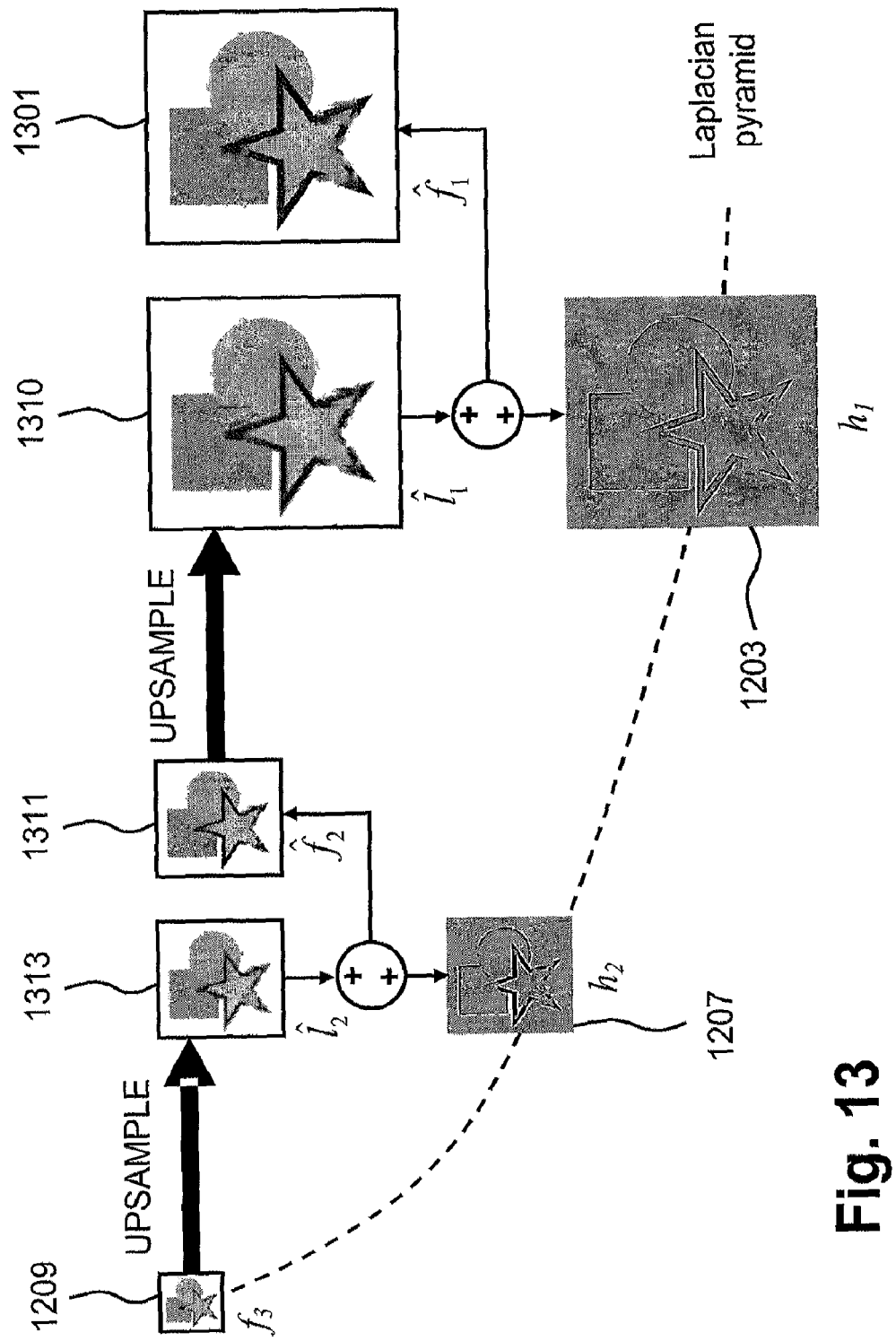
FIG. 13 shows an example of an intensity image being processed in accordance with the method of FIG. 18.
Figure 18:
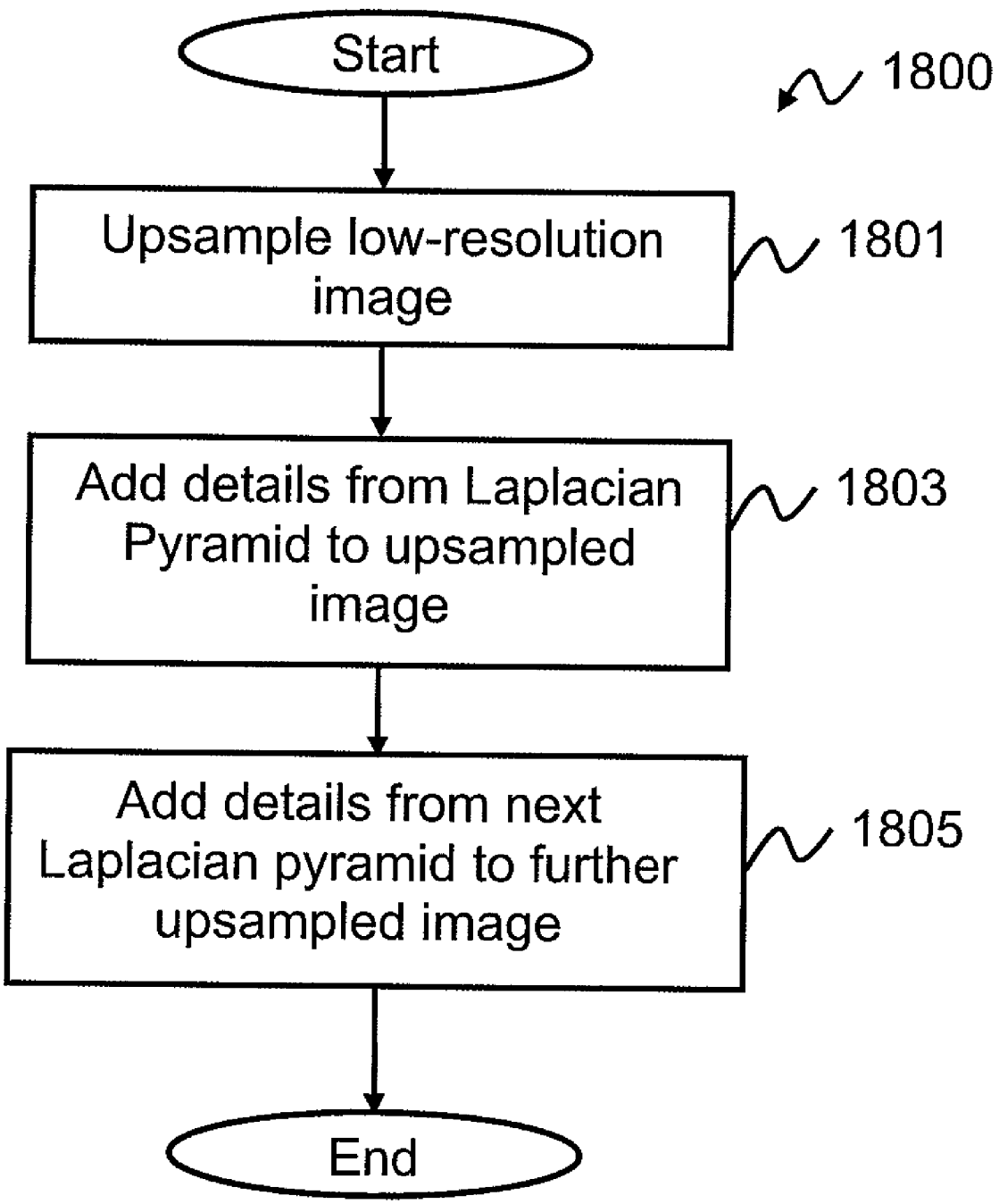
FIG. 18 is a flow diagram showing a method of constructing an inpainted image from a Laplacian pyramid, as executed in the method of FIG. 11.

The method 1800 of constructing an inpainted image from a Laplacian pyramid, as executed at step 1103, will now be described with reference to FIGS. 13 and 18. The method 1800 may be implemented as software resident in the hard disk drive 110 and being controlled in its execution by the processor 105.

The method 1800 begins from the topmost pyramid level, the low-resolution intensity image $f_3$ 1209. At step 1801, the processor 105 upsamples the low-resolution intensity image $f_3$ 1209 stored in the memory 106 using bilinear interpolation to produce a blurry image of twice the size $\hat{l}_2$ 1313. At the next step 1803, details from the next Laplacian pyramid image $h_2$ 1207 are then added to the upsampled image $\hat{l}_2$. The step of upsampling and Laplacian image addition, as executed at steps 1801 and 1803, produces a sharp image $\hat{f}_2$ 1311 of twice the size of the previous intensity image $f_3$ 1209. At the next step 1805, details from the next Laplacian pyramid image $h_1$ 1203 stored in memory 106 are then added to the upsampled image $\hat{l}_1$ 1310. The step of Laplacian image addition, as executed at step 1805, produces a sharp image $\hat{f}_1$ 1301. This process may be repeated iteratively on the newly produced intensity image until all images in the Laplacian pyramid are used.

The reconstructed image at highest resolution $\hat{f}_1$ 1301 is the smooth inpainted version of the alpha-masked image $f_1$ in FIG. 12. The intensities of pixels with low weight values are replaced by a combination of intensities of surrounding pixels with high weight values. In particular, the pixel intensities where the alpha mask equals one (1) are not changed while the pixel intensities where the alpha mask equals zero (0) are filled with valid intensities from the surrounding pixels.

Figure 2:
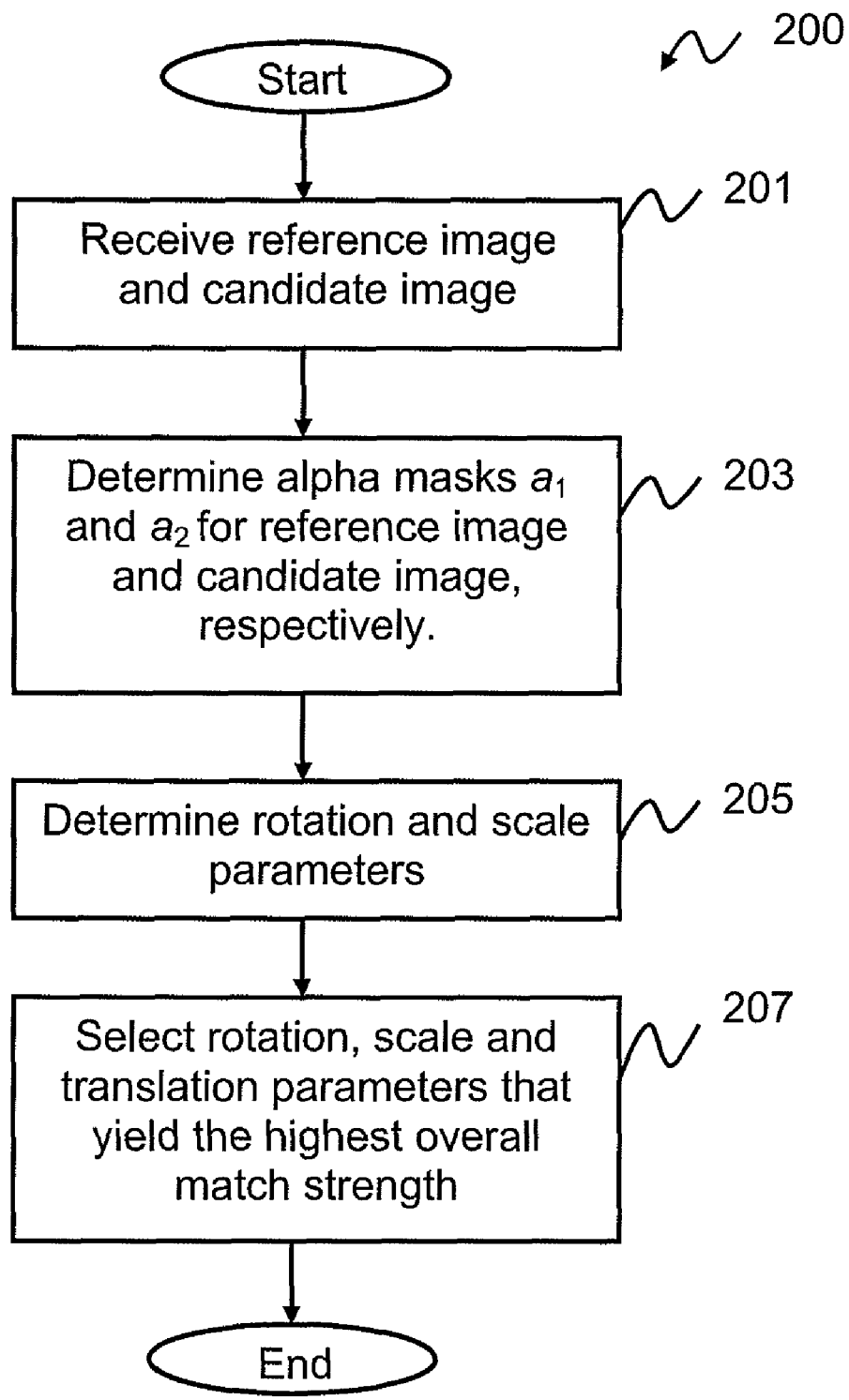
FIG. 2 is a flow diagram illustrating a method of registering images according to an exemplary embodiment.
Figure 14A:
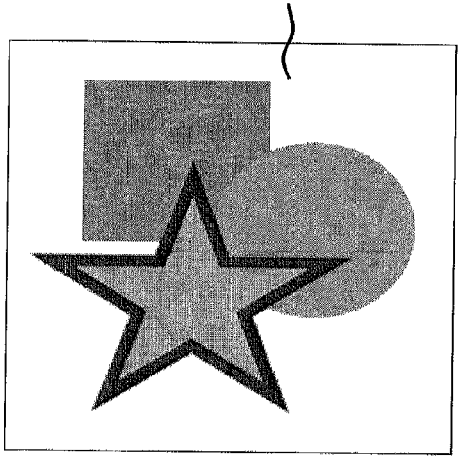
FIG. 14A shows a reference image.
Figure 14B:
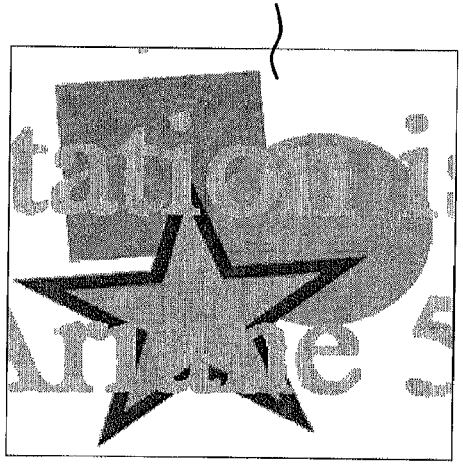
FIG. 14B shows an alpha-masked image.
Figure 14C:
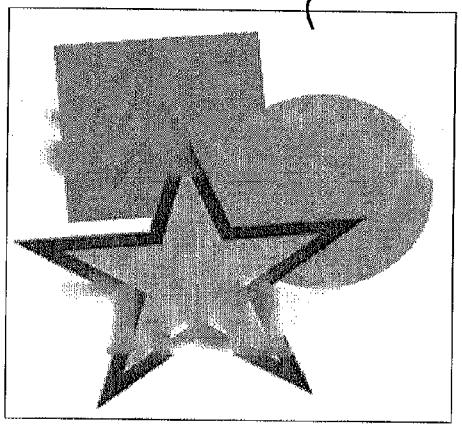
FIG. 14C shows an inpainted image.
Figure 14D:
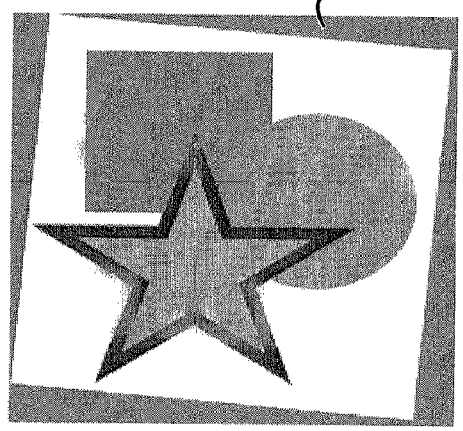
FIG. 14D shows an example of the image of FIG. 14C registered against the image of FIG. 14A in accordance with the method of FIG. 2.

FIG. 14D shows an example of an image 1404 registered in accordance with the method 200 of FIG. 2. In accordance with the described methods, an alpha-masked image 1402 shown in FIG. 14B is aligned against a reference image 1401 shown in FIG. 14A. The reference image 1401 has no mask, which is equivalent to its alpha mask being one (1) everywhere. In contrast, the mask of the second image 1402 is shown in FIG. 14B as overlaid text. Using smooth inpainting in accordance with the described methods, the pixel intensities under the mask of FIG. 14B may be filled with local intensity average.

FIG. 14C shows an inpainted image 1403 containing no mask, which is RST aligned with the reference image 1401 in FIG. 14A. FIG. 14D shows the image 1404 representing two aligned superimposed images (i.e., the image 1401 and image 1402). The image 1404 shows that a good alignment may be achieved using the described methods.

Figure 15:
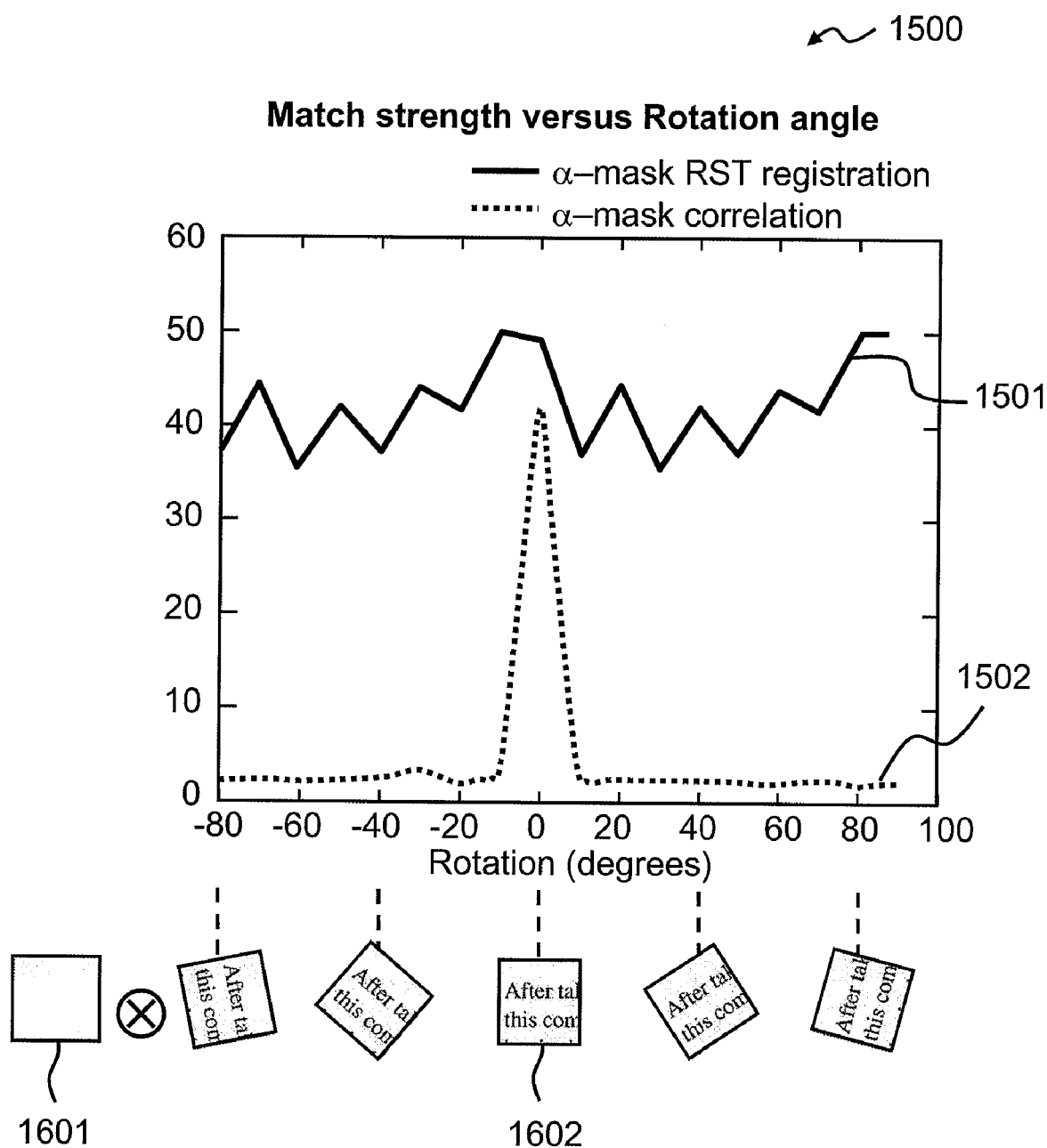
FIG. 15 is a graph showing the relationship between match strength and rotation according to one example.

A quantitative analysis of performance of the alpha-masked RST registration method described above is now described with reference to FIG. 15. FIG. 15 is a graph 1500 plotting match strength between a two hundred and fifty-six (256) pixel by two hundred and fifty-six (256) pixel blank scan of a paper 1601 and rotated versions of the same piece of paper 1602 after printing and processing in accordance with the described methods. The graph 1500 comprises a continuous curve 1501. The continuous curve 1501 shows that the match strength is stable over all the different rotation angles. The graph 1500 also comprises a dashed curve 1502 showing the match strength of the piece of paper 1601 for rotated versions of the piece of paper (eg., 1602) after being processed using alpha-masked correlation.

Figure 16:
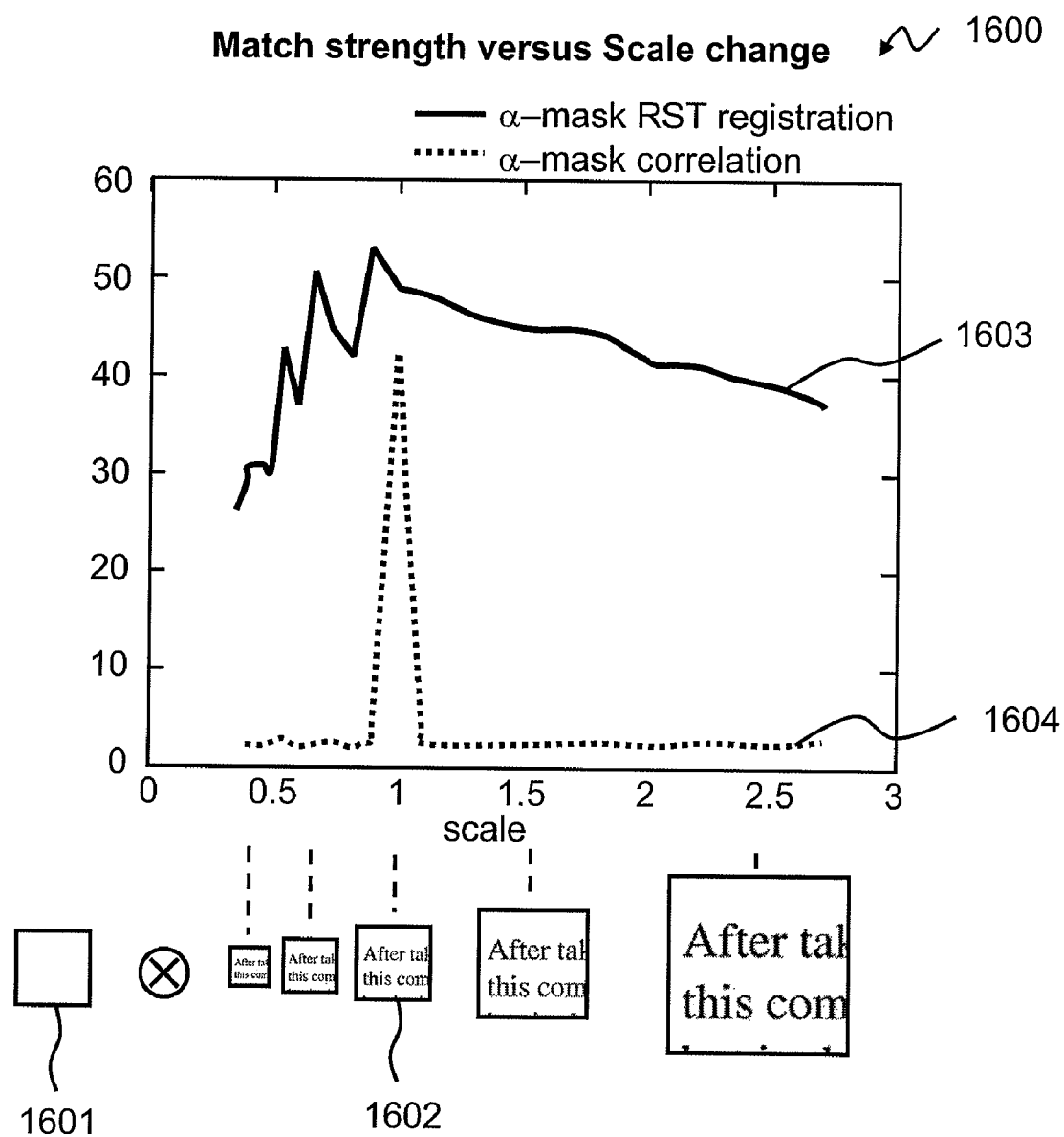
FIG. 16 shows the relationship between match strength and scaling according to another example.

Another experiment on the robustness of the alpha-masked RST registration method described above against image scaling is now described with reference to FIG. 16. In this experiment, the same piece of a paper 1601 is matched against scaled versions of the same piece of paper (e.g., 1602) after printing and processing in accordance with the described methods. FIG. 16 is a graph 1600 plotting match strength versus scale change for the piece of paper 1601. The graph 1600 comprises a continuous curve 1603. The continuous curve 1603 shows that the match strength of the alpha-masked RST registration methods described above remains high across a wide range of scaling factors. The graph 1501 also comprises a dashed curve 1604 showing the match strength of the piece of paper (1602) after being processed using alpha-masked correlation.

The alpha-masked RST registration methods described above may be used in video applications, form matching, and multi-purpose test charts. The images 152 and 153 may be obtained from a digital image of such a test chart.

For video applications, the alpha-masked RST registration methods may be used to estimate independent motions from a video sequence. The images 152 and 152 may be obtained from a video sequence that contains independently moving objects. In this instance, independently moving objects in a scene are segmented and alpha-masks of the objects are constructed from the segmentation. Independent RST motion parameters are then estimated for each object mask across each video frame.

For form matching, the alpha-masked RST registration methods described above may be used to classify forms from images of documents under any rotation and a large range of scaling (e.g. from 0.4 to 2.5 as demonstrated in FIG. 15 and FIG. 16). The classification is robust to form fillings due to the alpha-masked aspect of the RST registration.

For test chart related applications, the alpha-masked RST registration methods described above may be used to ignore different parts of the test chart during alignment. For example, due to chromatic aberration, different channels of a colour image may undergo different distortion. If the image is captured using a colour filter array, a colour filter mask may be used to perform alpha-masked RST alignment for each channel separately. The ability to ignore specific regions of a test chart during registration also allows different alignment patterns to be profiled on a single test chart. Specifically, the accuracy and repeatability of RST registration using each alignment pattern alone may be characterised and compared against common transformation of the whole test chart.

Industrial Applicability

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer implemented method of determining rotation and scale transformation parameters, said method comprising the steps of:
   determining a plurality of weight values associated with one or more parts of at least one of a first and second image;
   forming a representation of each of said first and second images using said weight values, the representation being substantially invariant to translation of said first and second images;
   determining rotation and scale transformation parameters relating said first and second images based on said representation of each of said first and second images; and
   storing the rotation and scale transformation parameters, at least one of the steps is performed by the computer.

2. The method according to claim 1, further comprising the step of performing alpha-masked autocorrelation on each of said first and second images using said weight values to form the translation invariant representations.

3. The method according to claim 1, further comprising the step of replacing intensities of pixels with low weight values by a combination of intensities of surrounding pixels with high weight values.

4. The method according to claim 1, further comprising the step of performing alpha-masked Fourier-Mellin correlation on the translation invariant representations.

5. The method according to claim 1, wherein said scaling parameters are within a range of 0.4 to 2.5.

6. The method according to claim 1, wherein said first and second images are obtained from visual characteristics of a selected area of a physical medium.

7. The method according to claim 1, wherein said first and second images are obtained from a video sequence that contains independently moving objects.

8. The method according to claim 1, wherein said first and second images are obtained from a digital image of a document.

9. The method according to claim 1, wherein said first and second images are obtained from a digital image of a test chart.

10. The method according to claim 6, wherein said physical medium is made of paper.

11. The method according to claim 6, wherein said physical medium is made of cardboard.

12. The method according to claim 6, wherein said physical medium is made of plastic.

13. An apparatus for determining rotation and scale transformation parameters, said apparatus comprising:
    a memory for storing data and a computer program;
    a processor coupled to said memory for executing said computer program, said computer program comprising instructions for:
    determining a plurality of weight values associated with one or more parts of at least one of a first and second image;
    for forming a representation of each of said first and second images using said weight values, the representation being substantially invariant to translation of said first and second images;
    determining rotation and scale parameters relating said first and second images based on said representation of each of said first and second images; and
    storing the rotation and scale transformation parameters.

14. A non-transitory computer readable medium, having a program recorded on the medium, where the program is configured to make a computer execute a method of determining rotation and scale transformation parameters, said program comprising:
    code for determining a plurality of weight values associated with one or more parts of at least one of a first and second image;
    code for forming a representation of each of said first and second images using said weight values, the representation being substantially invariant to translation of said first and second images;
    code for determining rotation and scale transformation parameters relating said first and second images based on said representation of each of said first and second images; and
    code for storing the rotation and scale transformation parameters.

15. A system for determining rotation and scale transformation parameters, said system comprising:
    a memory for storing data and a computer program; and
    a processor coupled to said memory executing said computer program, said computer program comprising instructions for:
    determining a plurality of weight values associated with one or more parts of at least one of a first and second image;
    forming a representation of each of said first and second images using said weight values, the representation being substantially invariant to translation of said first and second images;
    determining rotation and scale transformation parameters relating said first and second images based on said representation of each of said first and second images; and
    storing the rotation and scale transformation parameters.

* * * * *